United States Patent [19]
Barnes et al.

[11] Patent Number: 5,613,196
[45] Date of Patent: *Mar. 18, 1997

[54] METHOD AND APPARATUS FOR A DISTRIBUTIVE WIDE AREA NETWORK FOR A LAND MOBILE TRANSMISSION TRUNKED COMMUNICATION SYSTEM

[75] Inventors: Keith W. Barnes; Donald R. Bauman; Howard N. Brace; Philip A. Keefer; Michael E. Mihelich, all of Waseca, Minn.

[73] Assignee: E. F. Johnson Company, Minneapolis, Minn.

[ * ] Notice: The term of this patent shall not extend beyond the expiration date of Pat. No. 5,159,701.

[21] Appl. No.: 300,629

[22] Filed: Sep. 2, 1994

Related U.S. Application Data

[63] Continuation of Ser. No. 903,050, Jun. 23, 1992, abandoned, which is a continuation of Ser. No. 716,757, Jun. 18, 1991, Pat. No. 5,159,701, which is a continuation of Ser. No. 332,675, Mar. 31, 1989, abandoned.

[51] Int. Cl.$^6$ .................................................. H04B 7/155
[52] U.S. Cl. .......................... 455/15; 455/34.1; 455/54.1
[58] Field of Search .............................. 455/15, 17, 33.1, 455/33.4, 34.1, 34.2, 54.1; 340/825.03; 379/58, 59, 60, 63

[56] References Cited

U.S. PATENT DOCUMENTS

| | | |
|---|---|---|
| Re. 28,577 | 10/1975 | Schmidt . |
| Re. 32,789 | 11/1989 | Lynk, Jr. . |
| 3,855,422 | 12/1974 | Cadiou . |
| 3,985,961 | 10/1976 | Voss et al. . |
| 4,029,901 | 6/1977 | Campbell . |
| 4,092,600 | 5/1978 | Zimmerman . |
| 4,127,744 | 11/1978 | Yoshikawa . |
| 4,317,218 | 2/1982 | Perry . |

(List continued on next page.)

FOREIGN PATENT DOCUMENTS 62-101136  4/1987  Japan .

OTHER PUBLICATIONS

Telecarrier Americom—Setting a new SMR Standard, vol. 9, Issue 4—Apr. 1986.
American Product Literature The future of Trunked Radio Communications at work now, Nov. 1988, p. 1–10.
System Operation, Nov. 1988 p. 1–8. Equipment Description Nov. 1988, pp. 1–3.
Grindahl, M., "Automatic Communications System", Proceedings of the Annual Conf. of the IEEE.
Vehicular Technology Society, 15 Sep. 1980, pp. 1–5.
"E.F. Johnson Clear Channel LTR Application Note", Part No. 009–0001–020 (Rev. 5 Oct. 1988).

*Primary Examiner*—Edward F. Urban

[57] ABSTRACT

A land mobile transmission trunked communication system is provided with a unique switching protocol arrangement among repeaters that are networked to one or more external communication networks. The land mobile transmission trunked communication system includes a plurality of transceivers for transmitting and receiving transmission trunked radio communications over one or more radio channels. The transceivers communicate with a selected one of a plurality of repeaters to establish transmission trunked radio communications on a preassigned radio channel. The unique switching protocol arangement includes a switch that is operably connected to each repeater and selectively communicates information signals between a repeater and an external communication network. A bus system is operably connected to each repeater and to the switch for communicating control signals among all of the repeaters and the switch. The control signals include an indication for each repeater which is controlled by that repeater and by the switch as to free channel availability. Because the mechanism for controlling indications of free channel availability is operationally separate from the switch, the repeaters continue to provide transmission trunked communications to the transceivers in the event of a failure of the switch.

9 Claims, 34 Drawing Sheets

U.S. PATENT DOCUMENTS

| | | |
|---|---|---|
| 4,347,625 | 8/1982 | Williams . |
| 4,380,052 | 4/1983 | Shima . |
| 4,398,289 | 8/1983 | Schoute . |
| 4,399,555 | 8/1983 | MacDonald et al. . |
| 4,410,889 | 10/1983 | Bryant . |
| 4,468,090 | 3/1987 | Maddern . |
| 4,503,533 | 3/1985 | Tobagi . |
| 4,516,205 | 5/1985 | Eing . |
| 4,517,561 | 5/1985 | Burke et al. . |
| 4,517,669 | 5/1985 | Freeburg . |
| 4,525,832 | 6/1985 | Miyad . |
| 4,525,837 | 6/1985 | Tan . |
| 4,534,061 | 8/1985 | Ulug . |
| 4,553,262 | 11/1985 | Coe . |
| 4,578,815 | 3/1986 | Persinotti ................... 455/15 |
| 4,585,903 | 4/1986 | Schiller . |
| 4,603,418 | 7/1986 | Townsend . |
| 4,612,415 | 9/1986 | Zdunk . |
| 4,636,791 | 1/1987 | Burke et al. . |
| 4,646,345 | 2/1987 | Zdunek et al. . |
| 4,649,567 | 3/1987 | Childress ................... 455/17 |
| 4,658,435 | 4/1987 | Childress . |
| 4,670,905 | 6/1987 | Sandvos . |
| 4,670,906 | 6/1987 | Thro . |
| 4,672,601 | 6/1987 | Ablay . |
| 4,672,608 | 6/1987 | Ball et al. . |
| 4,672,657 | 6/1987 | Dershowitz . |
| 4,677,656 | 6/1987 | Burke et al. . |
| 4,682,367 | 7/1987 | Childress . |
| 4,692,945 | 9/1987 | Zdunek . |
| 4,698,805 | 10/1987 | Sasuta . |
| 4,701,944 | 10/1987 | Howard . |
| 4,712,229 | 12/1987 | Nakamura . |
| 4,716,407 | 12/1987 | Borras et al. . |
| 4,718,108 | 1/1988 | Davidson et al. . |
| 4,723,264 | 2/1988 | Sasuta . |
| 4,730,187 | 3/1988 | Menich . |
| 4,775,998 | 10/1988 | Felix et al. . |
| 4,817,190 | 3/1989 | Comroe et al. . |
| 4,831,373 | 5/1989 | Hess . |
| 4,833,701 | 5/1989 | Comroe et al. . |
| 4,835,731 | 5/1989 | Nazarenko et al. . |
| 4,843,633 | 6/1989 | Menich . |
| 4,870,408 | 9/1989 | Zdunek et al. . |
| 4,870,699 | 9/1989 | Garner et al. . |
| 4,876,738 | 10/1989 | Selby . |
| 4,887,265 | 12/1989 | Felix . |
| 4,903,321 | 2/1990 | Hall et al. ................... 455/34 X |
| 4,905,234 | 2/1990 | Childress et al. . |
| 4,905,302 | 2/1990 | Childress et al. . |
| 4,905,305 | 2/1990 | Garner et al. . |
| 4,926,496 | 5/1990 | Cole et al. . |
| 4,939,746 | 7/1990 | Childress . |
| 4,972,460 | 11/1990 | Sasuta . |
| 5,014,345 | 5/1991 | Comroe et al. . |
| 5,020,130 | 5/1991 | Grube et al. . |
| 5,020,132 | 5/1991 | Nazarenk . |
| 5,054,068 | 10/1991 | Hess et al. . |
| 5,054,109 | 10/1991 | Blackburn . |
| 5,077,828 | 12/1991 | Waldroup . |
| 5,125,102 | 6/1992 | Childress et al. . |
| 5,128,930 | 7/1992 | Nazarenko et al. . |
| 5,133,080 | 7/1992 | Borras . |
| 5,172,396 | 12/1992 | Rose, Jr. et al. . |
| 5,175,866 | 12/1992 | Childress et al. . |
| 5,212,724 | 5/1993 | Nazarenko et al. . |
| 5,265,093 | 11/1993 | Dissosway et al. . |
| 5,274,837 | 12/1993 | Childress et al. . |
| 5,274,838 | 12/1993 | Childress et al. . |

Fig. 13A

| Fig.13A-1 | Fig.13A-2 |
|---|---|

Fig. 13B

| Fig.13B-1 | Fig.13B-2 |
|---|---|

Fig. 13C

| Fig.13C-1 | Fig.13C-2 |
|---|---|

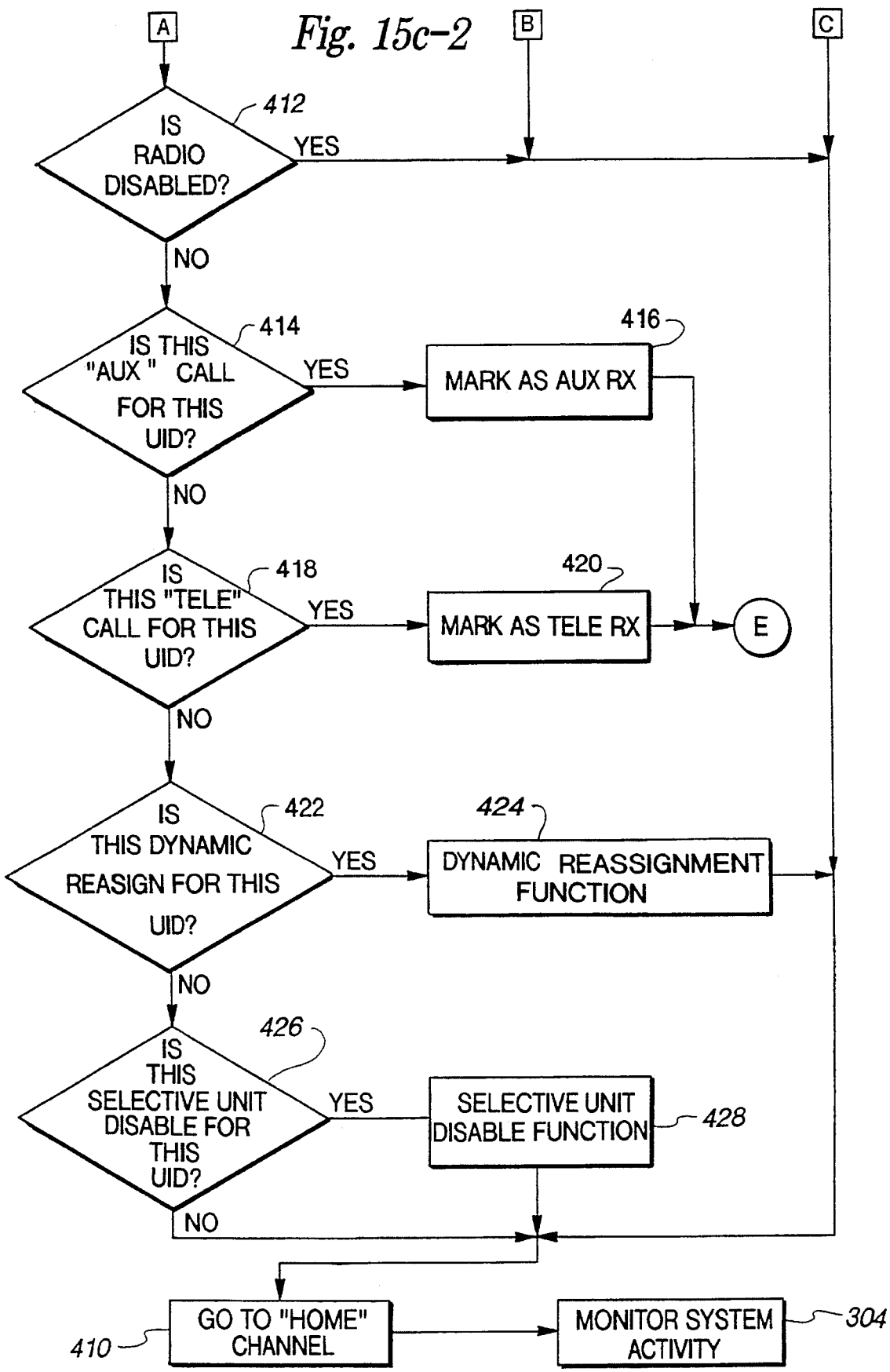

METHOD AND APPARATUS FOR A DISTRIBUTIVE WIDE AREA NETWORK FOR A LAND MOBILE TRANSMISSION TRUNKED COMMUNICATION SYSTEM

This is a continuation, of application Ser. No. 07/903,050, filed Jun. 23, 1992, now abandoned, which is a continuation of U.S. Pat. No. 5,159,701, issued Oct. 27, 1992 from Ser. No. 07/716,757, which was a continuation of an original application Ser. No. 07/332,675, filed Mar. 31, 1989, now abandoned.

TECHNICAL FIELD

This invention pertains to land mobile radio communication systems. In particular, the present invention pertains to a method and apparatus for distributively interconnecting a plurality of land mobile transmission trunked communication systems into a wide area network. The invention includes switching and signaling protocols especially adapted for communication of control signals in the subaudio band an expanded feature set of radio communications capabilities.

BACKGROUND ART

Mobile radio communication systems provide for two way radio communications between a central control station and a fleet of cars, trucks, or other vehicles. Typical users of mobile radio communication systems include, for example, police departments, fire departments, taxi services and delivery services. Present mobile radio communication systems can be configured to provide for radio communications between the control station and all vehicles in a fleet, between the control station and selected vehicles in the fleet, or between different individual vehicles or groups of vehicles within a fleet.

Conventional mobile radio communication systems are typically organized with a number of vehicles and a control station assigned to a single common channel for a given coverage zone. A user assigned to the common channel must wait until no one else is transmitting on that channel before sending a message, because only one transmission at a time can be processed by a single channel. Even when a transmission is addressed to only one user in a conventional system (and therefor not heard by other users), the other users in the system must wait until that transmission is completed before they can use the system to communicate.

Mobile radio communication systems using transmission trunking are an improvement over conventional mobile radio communication systems in that trunked systems enable two or more users to communicate on the system at the same time. For instance, the dispatch console in a transmission trunked communication system can be communicating with one of the vehicles in the fleet; while, at the same time, two other vehicles in the fleet can be using the same trunked system to communicate with each other. Transmission trunked communication systems group a number of channels for the same coverage zone together into a single radio communication system, with each channel accessible to each user in the system. Because each user will only need to communicate over the trunked system part of the time, and because it is unlikely that all users will need to communicate at precisely the same time, the number of channels assigned to a trunked system group can always be less than the number of users allocated to that trunked system group.

The United States Federal Communications Commission (FCC) has assigned 600 channels in the 800 MHz band for trunked land mobile use. Each channel is comprised of a pair of assigned frequencies, a mobile transmit frequency and a repeater transmit frequency. Mobile transmit frequencies are 806–821 MHz, with the repeater transmit frequencies exactly 45 MHz above the corresponding mobile transmit frequency, or 851–866 MHz. Channel spacing is 25 KHz, with the maximum allowed deviation between channels being +/–5 KHz. In September 1987, the FCC also allocated 399 channels in the 900MHz band for trunked land mobile use. Mobile transmit frequencies are 896–901 MHz, with the repeater transmit frequencies exactly 39MHz above the corresponding mobile transmit frequency, or 935–940 MHz. Channel spacing is 12.5 KHz, with the maximum allowed deviation between channels being +/–2.5 KHz.

In transmission trunked communication systems, a signaling protocol is used to send and receive control signals among users on each channel In the trunked system and a switching protocol is used to establish which channels those users will be communicating over. The preferred conventional transmission trunked communication system uses a signaling protocol that transmits the control signals In the subaudio band simultaneously with the transmission of voice or data information signals. Signaling protocols that can communicate control signals within the constraints of the subaudio band are preferred, because use of the subaudio band precludes the need for using a dedicated channel for transmitting the control signals (thereby reducing the number of available channels In the trunked system for voice and data communications). A switching protocol is used by the trunked system to automatically find and engage an open channel when a user initiates a transmission. To maximize the trunking capabilities of such a system, the switching protocol must efficiently allocate channels in the trunked system and avoid channels that are already in use at the time the transmission is initiated. For further explanation of the preferred conventional transmission trunked communication systems, reference is made to the description of the operation of the ClearChannel LTR® system contained in the manual entitled "E. F. Johnson ClearChannel LTR Application Note", Part No. 009-0001-020 (Rev. 5, Oct. 1988), available from E. F. Johnson Company, Waseta, Minn., a copy of which is attached as Appendix A and is fully Incorporated by reference herein.

Transmission trunked communication systems have proven to be an economical and effective means for establishing voice and data communications between a dispatch console or control station and a fleet of mobile vehicles in a given coverage zone. However, the capability of such trunked systems to provide radio communications over a wide area serviced by a plurality of preferably adjacent coverage zones has been limited because of the problems involved in linking multiple coverage zones and because of the limitations of the switching and signaling protocols of present transmission trunked communication systems.

Present transmission trunked communication systems of the type described above are generally unable to transfer voice/data communication between coverage zones, because the repeaters in such systems are interconnected only by a single time slot status bus. As a result, the only method of interconnecting repeaters in different coverage areas is to use an external network, i.e. routing the communication as a long-distance telephone call from a repeater interconnect or interface to a telephone exchange and then back through a second repeater interconnect to the remote repeater location. These channels are then "hung" to lock the channels in for the duration of the call. In addition to the increased expense and inconvenience of such an external network, the use of a repeater interconnect prevents usage of the channels in each trunked system over which the communication is occurring for the entire period of the communication.

Even in those instances where inter-coverage zone communications are made through an external network, such communications are for individuals calls, not fleet calls, and are limited to a few preselected users on each system. It would be desirable to provide unique ID numbers for each user on a wide area network to allow for direct entry of the unique ID to establish private communication between users on the network, as well as fleet calls between groups of users on the network. Unfortunately, it is impossible to accommodate unique ID numbers in the preferred present transmission trunked communication system because the number of digital bits required to represent such unique ID numbers exceeds the maximum number of bits that the trunked systems can communicate via the established signaling protocol. The signaling protocol of the preferred transmission trunked communication system is also limited in the number of channels that may be grouped together per trunked system. For example, the signaling protocol of the LTR® trunked system is limited to 20 channels per system and uses a look-up table to translate the channel information transmitted by the signaling protocol into the actual frequency pair assigned to that channel.

Another problem with the conventional switching and signaling protocols is that such protocols are unable to allow for the implementation of an extended feature set of radio communication capabilities on the preferred conventional transmission trunked communication systems. For example, present trunked systems are generally unable to establish priority access for users in a given coverage zone. Present trunked systems are also unable to interrogate and reprogram or otherwise modify the operation of mobiles without having the mobile transceiver unit physically brought to a service facility to be reprogrammed. A mobile traveling from one coverage zone to another coverage zone, for instance, needs to be reprogrammed for a different set of groups over which communications will be received. Such reprogramming cannot be done "on the fly" in present systems, and mobiles are therefor not able to transit coverage zones at will.

One approach to a wide area network for communications systems is cellular telephone networks. In cellular telephone networks, a large number of overlapping coverage zones (cells) are used to provide coverage over an entire area. The primary difficulties that must be overcome by cellular networks relate to the handoff of communications when a mobile transceiver moves from cell to cell during a transmission. This type of approach is unnecessary for transmission trunked communications systems because the coverage zones of trunked systems are much larger. In addition, because transmissions on a transmission trunked communication system are trunked and are relatively short, there is no need to handoff a mobile transceiver from one coverage zone to mother during a transmission. Although automatic handoff of radio communications is well developed in cellular radiotelephone systems, such an automatic handoff occurs within a coordinated single system under the direction of a central processing system, not between separate coverage zones utilizing distributed processing techniques. Consequently, the body of knowledge regarding such handoff techniques is not particularly applicable when coordination between two or more trunked systems is minimal and the trunked systems are to be distributively interconnected.

Another approach to a wide area network for transmission trunked communication systems uses a separate control channel for communicating control signals and simulcasts the same message on the same frequencies for different coverage zones. This approach requires an extensive centralized processing capability to monitor and assign channels for communications extending beyond a single coverage zone. Still another approach to a wide area network for transmission trunked communication systems uses a high speed mode to communicate extended control signals with the mobile transceivers in a coverage zone. Although the use of a high speed mode allows for large amounts of control information to be communicated with the mobile, the use of different transmission speeds may cause signal degradation and possibly missed communications because of the required switching between high speed mode and normal communications with the mobile transceiver.

The underlying problem with previous approaches to establishing a wide area network for a transmission trunked communication system is that the networks are centralized and require significant amounts of control information to be both communicated between the repeaters and the mobile (either by a dedicated control channel or by the use of a high speed mode) and be processed by a central processing unit that coordinates all of this information about each user in the entire network. Each of these systems results in increased overhead, both in terms of the hardware required to operate the trunked systems and the network itself, and in terms of the amount of control signals and other information that is communicated between the repeater and the mobile transceivers. Moreover, the use of a centralized approach to the wide area network significantly decreases the fault tolerance capabilities of the network and of the transmission trunked communication systems themselves. The reliance on a powerful central processing capability to perform the network operations leave users open to the possibility of loss of radio communication service in the event that the central processing unit fails.

Although present transmission trunked communication systems have proven to be an economical and effective means for establishing voice and data communications between a control station and a fleet of mobile vehicles in a given coverage zone, it would be advantageous to provide a method and apparatus for distributively interconnecting a plurality of land mobile transmission trunked communication systems into a wide area network that included switching and signaling protocols especially adapted for communication of control signals in the subaudio band and an expanded feature set of radio communications capabilities.

SUMMARY OF THE INVENTION

In accordance with the present invention, a method and apparatus for distributively interconnecting a plurality of land mobile transmission trunked communication systems into a wide area network is provided. The invention includes a plurality of distributive radio network terminal (RNT) switch means and a unique signaling protocol and a switching protocol especially adapted for communication of control signals in the subaudio band for interconnecting a plurality of transmission trunked communications systems into a wide area network. The switching and signaling protocols hereof provide an expanded feature set of radio communications capabilities.

Each of the transmission trunked communication systems of the present invention includes a plurality of transceiver means for transmitting and receiving transmission trunked radio communications over one or more channels and a plurality of repeater means for establishing transmission trunked radio communication between the repeater means and one or more of the transceiver means. The transmission trunked radio communications are made up of an information signal (voice or data information) and a control signal (control information transmitted pursuant to a signaling protocol) and are communicated between the transceiver means and the repeater means with the control signals transmitted simultaneously in the subaudio range of the same channel over which the information signals are being transmitted.

The distributive RNT switch means and the trunking architecture of the signaling protocol and switching protocol of the present invention are specifically designed to provide trunked transmission radio communications to a large fleet of users. The features and operational parameters of both the RNT switch means and the transmission trunked communication systems are directed at users who are dependent on fast, reliable, fleet-based dispatching for their everyday operations. The trunking architecture utilizes a signaling protocol and switching protocol that are designed for high density traffic and fast access time, and which allow for an expanded feature set of communication options. The system is spectrum efficient, using all licensed channels for voice/data communication and transmission trunking to eliminate wasted air time between message exchanges.

The present invention is designed to provide the greatest benefits the largest percentage of time for the primary users of such a transmission trunked communication system. These users include the government services market, both emergency and nonemergency, the utility market, the public transportation market, the large industrial complex market, and the SMR (specialized mobile radio) market. The requirements for these markets are similar in many ways, but because the public safety requirements are more stringent, the trunking architecture is designed using the public safety requirements as the standard.

The distributively interconnected transmission trunked communication systems of the present invention meet these requirements by providing centralized full-featured dispatching with the ability to view the entire operation of the network utilizing a central control console that can monitor and participate in multiple calls simultaneously. The invention provides unique identification of users on all transmissions, including fleet calls, and provides for a method of priority access to enable emergency and non-emergency users to share the same system. The signaling protocol includes a dual word system key encryption of all transmissions on the network for increased security. The invention also allows for dynamic reconfiguration of the transceivers means by over-the-air commands using special control signals, including automatic or manual registration of mobile transceivers in a new system, home channel backup, and the capability to disable mobile transceivers. As a wide area network, the present invention provides the capability of full duplex or half-duplex communications with individual users or groups of users over a plurality of coverage zones. Because of the distributive and modular nature of the RNT switch means of the present invention, it is possible to integrate the transmission trunked communication systems of the present invention with conventional channel systems or with the present LTR trunked systems. Each RNT switch means includes a system management module that allows the user to selectively configure the transmission trunked communication system for that particular user's needs, as well as monitor the activity on the trunked system. Other features and advantages of the present invention will be described in the detailed description of the preferred embodiment set forth below.

Accordingly, it is an objective of the present invention to provide a method and apparatus for distributively interconnecting a plurality of land mobile transmission trunked communication systems into a wide area network.

It is a further objective of the present invention to provide a unique signaling protocol and a switching protocol especially adapted for communication of control signals in the subaudio band for interconnecting the transmission trunked communications systems into a wide area network that also provides for an expanded feature set of radio communications capabilities.

It is an additional objective of the present invention to provide unique identification of users on all transmissions in a transmission trunked communication system.

It is a still further objective of the present invention to provide a method and system of priority access for users in a transmission trunked communication system.

It is a still further objective of the present invention to provide a method and system for dynamic reconfiguration of mobile transceivers in a transmission trunked communication system, automatic or manual registration of mobile transceivers in a new system, and home channel backup.

These and other objectives of the present invention will become apparent with reference to the drawings, the detailed description of the preferred embodiment and the appended claims.

DESCRIPTION OF THE PREFERRED EMBODIMENTS

Figure 1:
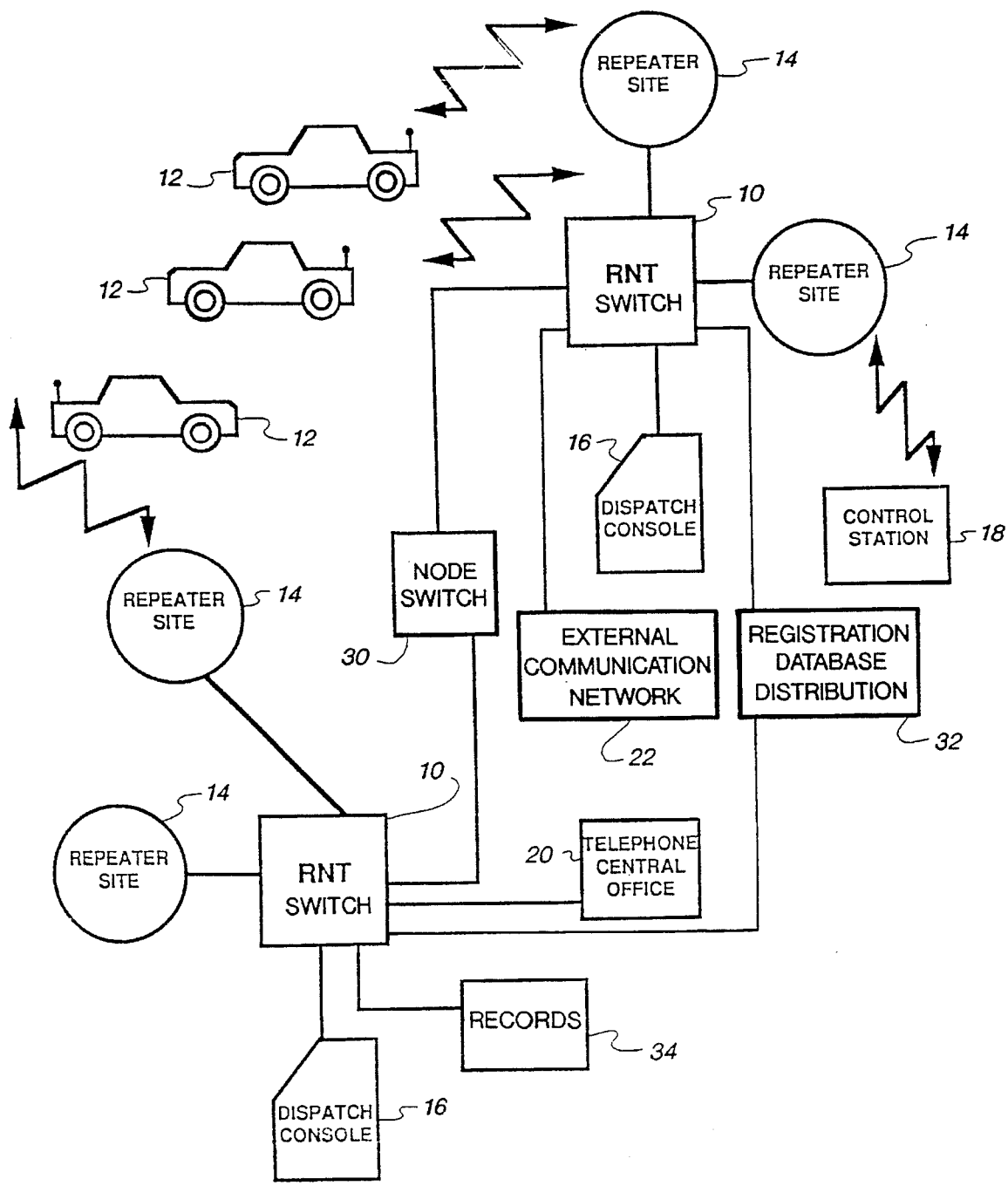
FIG. 1 is an overall block diagram of the preferred embodiment of a multiple radio network terminal (RNT) switch means implementing the wide area network mobile radio communication system of the present invention.

Referring now to FIG. 1, the preferred embodiment of the method and apparatus for distributively interconnecting a plurality of land mobile transmission trunked communication systems into a wide area network will be described. The invention includes a plurality of distributive radio network terminal (RNT) switch means 10 that utilize a unique signaling protocol and a switching protocol especially adapted for communication of control signals in the subaudio band. There is one RNT switch means 10 for each transmission trunked communication system. Each transmission trunked communication system includes a plurality of transceiver means 12 for transmitting and receiving transmission trunked radio communications over one or more channels and a plurality of repeater means 14 for establishing transmission trunked radio communication between the repeater means 14 and one or more of the mobile transceiver means 12. The transmission trunked radio communications comprises an information signal and a control signal using transmission trunking, with the control signals transmitted simultaneously in the subaudio range on the same channel over which the information signals are transmitted. The RNT switch means 10 are used for selectively interconnecting two or more of the repeater means 14 in each trunked system, as well as providing the link between trunked systems in a wide area network.

The RNT switch means 10 may also be connected to a dispatch console means 16 for monitoring the users at the transceivers means 12 and dispatching calls and other communications. Alternatively, a remotely located control station means 18 may also be used to perform the dispatching function on the system. The control station means 18 may include a selective call console and communicates with the repeater means 14 by way of radio communication to link to the RNT switch means 10, rather than via a direct or hard-wired connection with the RNT switch means 10. In addition, the RNT switch means 10 may be connected with the telephone central office 20 or an external communication network 22 (e.g, a satellite communication system or a private PBX system) to allow users on the system to make and receive communications or calls outside of the network.

Two or more of the RNT switch means 10 may be interconnected by a node switch means 30 that operates as a high speed voice grade communication path between two RNT switch means 10. The node switch means 30 may be any type of matrix switching equipment or PABX that is capable of handling directed voice switching. The RNT switch means 10 may also be interconnected to a registration means 32 for maintaining a database of registration information that can be communicated among the switch means as a mobile transceiver moves from coverage zone to coverage zone as described hereinafter. Finally, one or more of the RNT switch means 10 may be connected to a monitoring means 34 for monitoring activity on the network and performing record keeping, billing and other accounting information functions. The activities of the node switch means 30, the registration means 32 and the monitoring means 34 may be contained within a single computer linked to each of the RNT switch means 10, or may be distributed among several processors linked to one or more of the RNT switch means 10, depending upon the type of configuration and the functions that are required of a particular user's network.

The general operation of an independent transmission trunked communication system associated with each RNT switch means 10 will now be described. Control signaling between the repeater means 14 associated with an RNT switch means 10 and the transceiver means 12 is done with subaudio control signals on each channel designated as a "home channel". Each mobile transceiver means 12 in the trunked system is assigned to a home channel that it monitors when the transceiver is not involved in a call. The transceiver means 12 may be either a mobile transceiver located in a car or a handheld transceiver. (The terms mobile, transceiver and mobile transceiver as used hereinafter refer to any such transceiver means 12). The transceiver means 12 receives control signal instructions over the home channel to either stay on the home channel and open its audio to receive a call, or to change to a different channel and open its audio to receive a call. If the transceiver means 12 was sent to another channel to receive a call, it will return to its home channel as soon as the call is completed.

When a transceiver means 12 wants to initiate a call, all the operator has to do is depress the push-to-talk (PTT) button and hold it. If the home channel assigned to the mobile transceiver means 12 is available, the transmitter for the transceiver means 12 will transmit a control signal on the home channel frequency telling the repeater means 14 that a call is being setup on that channel. At that point, the transceiver means 12 turns its transmitter off and waits for a return message from the repeater means 14. If the repeater means 14 is not busy, the repeater means 14 will broadcast a handshake message that will be received by all mobile transceiver means 12 assigned to the same home channel. The operator of the initiating transceiver means 12 will hear an audible proceed tone and its transmitter will be enabled to proceed with the call. For this type of fleet calling, all other transceiver means 12 with the correct fleet identification will remain on the channel and open their squelch to receive the call. All transceiver means 12 that did not have the proper fleet identification would remain muted, but the logic unit of the transceiver means 12 would receive and store the control signal indicating that their home channel was now busy and that they would get a free channel assignment. As a result, if a transceiver means 12 not involved in the call described above now wanted to initiate a call, it would know where a free channel was so that it would not have to look for a free channel in the trunked system.

If the home channel for a transceiver means 12 was busy when a call was initiated, the initial data transmission would be made on the free channel that It had stored in memory. The repeater means 14 receiving the call would notify the repeater means 14 for the home channel assigned to the transceiver means 12 Initiating the call that a call was being setup on the free channel for a fleet assigned to the home channel repeater means 14. The home channel repeater means 14 would then add this information to the control signal being sent out over the home channel, and would also change the free channel assignment to another free channel. The transceiver means 12 that had a proper fleet assignment would receive the control signal sent out over the home channel that a call was being setup for their fleet on the directed channel and would switch to that channel and open their squelch to receive the call. All other transceiver means 12 that did not have the proper fleet assignment would store the free channel information and would continue to monitor the home channel.

To understand how the method and apparatus for a mobile transmission trunked communication system wide area network of the present invention operates, it is helpful to divide the discussion of the preferred embodiment into a discussion of the signaling and switching protocol used by the invention and a discussion of the architecture and organization of both the wide area network and the individual transmission trunked communication systems associated with each RNT switch means 10. The overall philosophy behind both the protocols and the architectures that will be explained is a distributive approach to networking, as compared to the centralized approach currently applied to wide area networks for transmission trunked communication systems. This distributive philosophy reduces the overhead involved in managing the network and the trunked systems, while at the same time increases the reliability of the network and each trunked system by eliminating reliance on critical components and providing for built-in backup features to insure that communications over the network and the trunked systems are maintained.

Signaling Protocol Architecture

The architecture for the signaling protocol of the present invention is an enhanced and expanded version of the LTR® signaling protocol that was first introduced into the United States market in 1980 and has since become the de facto transmission trunking standard. Familiarity with the LTR system, including the LTR signaling protocol, the LTR repeaters and the various LTR compatible mobile transceivers can be obtained from a review of the previously incorporated reference attached hereto as Appendix A and is presumed for the discussion that follows.

Figure 2:
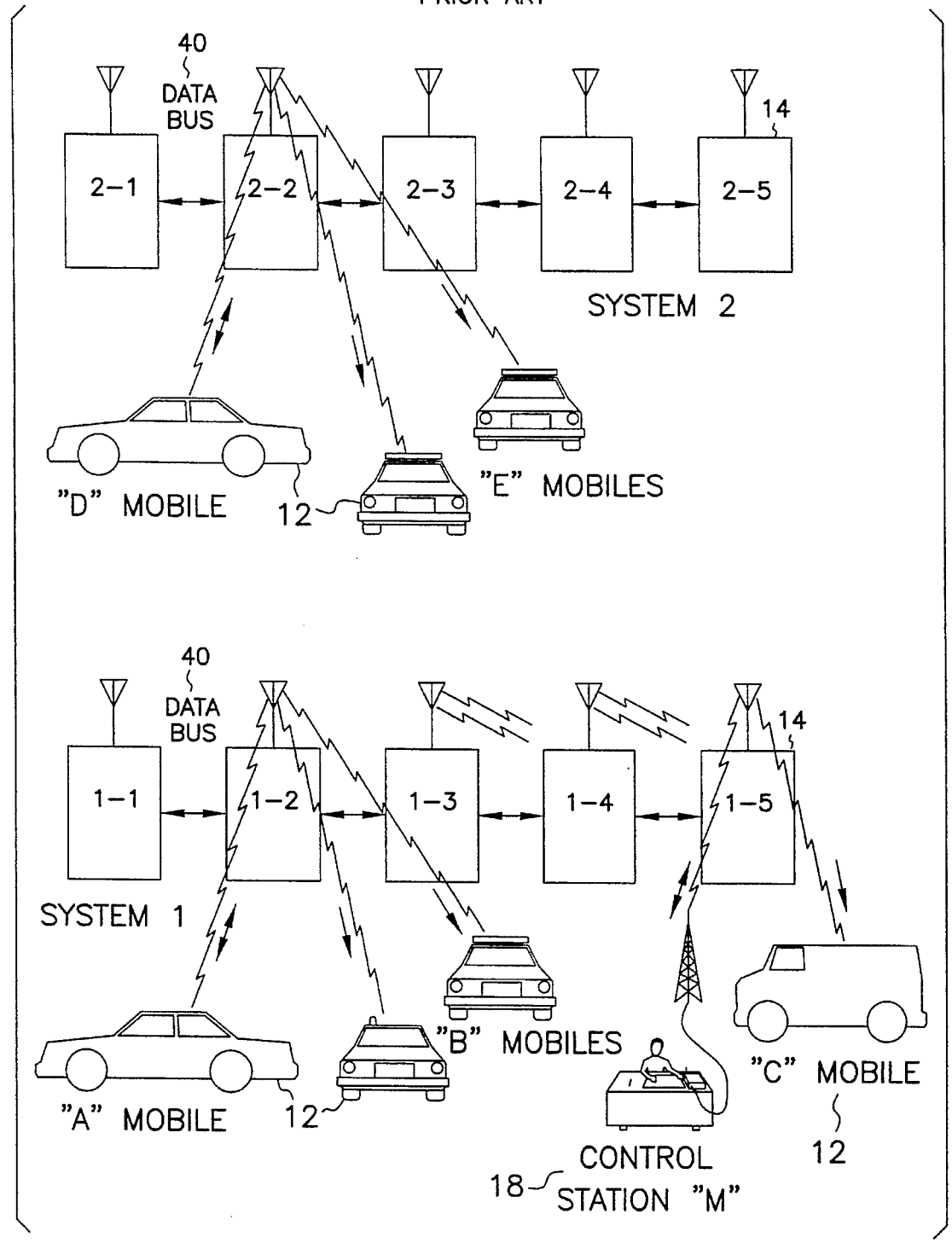
FIG. 2 is a pictorial representation of a multiple site conventional transmission trunked land mobile communication system.
Figure 3:
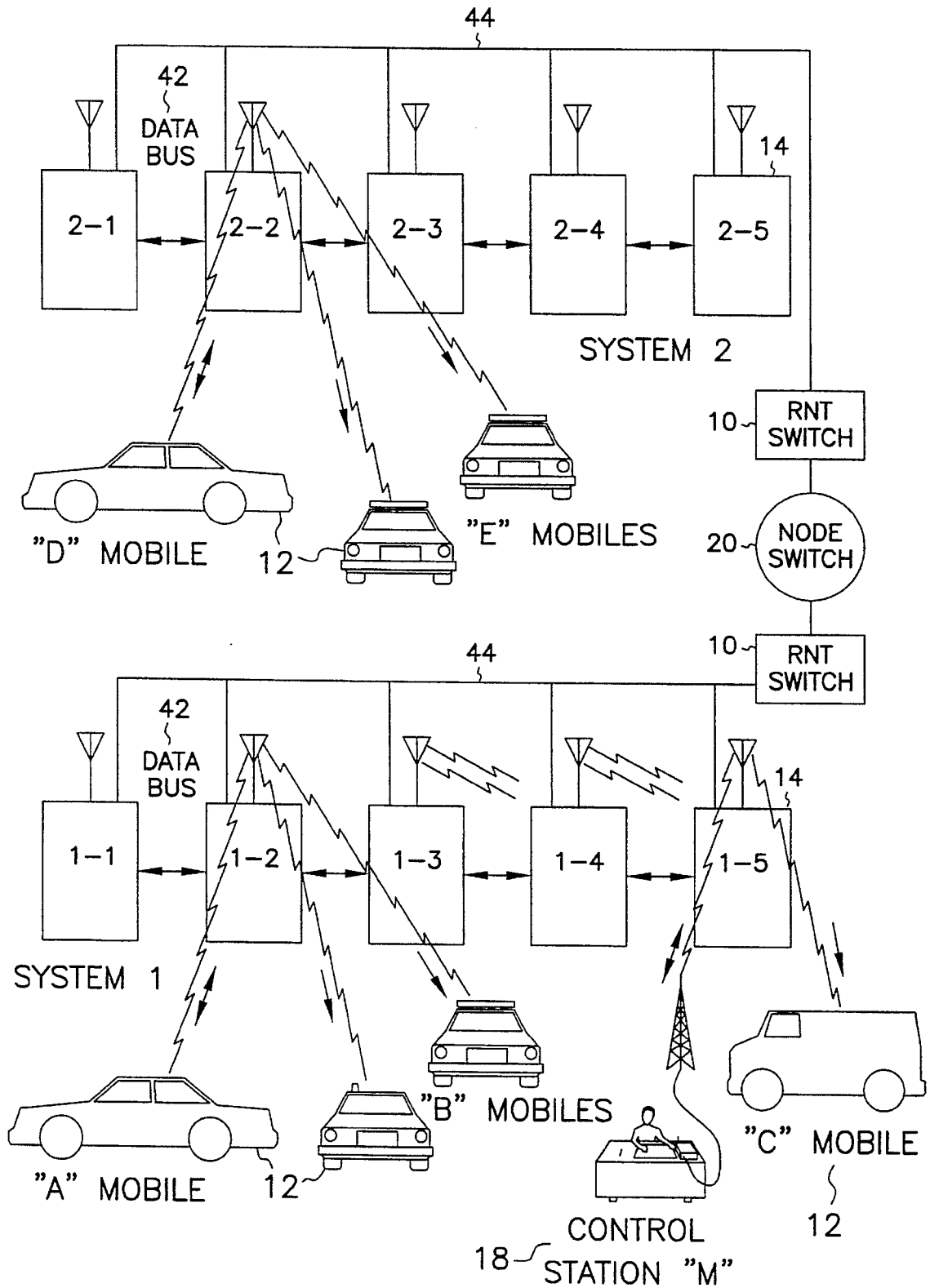
FIG. 3 is a pictorial representation of the RNT switch means of the present invention.

Referring now to FIGS. 2 and 3, the differences between a conventional multiple site LTR repeater configuration and a transmission trunked communication system of the present invention will be explained. In the LTR configuration shown in FIG. 2, the mobile transceiver means 12 (Mobiles A. B and C) and the control station means 18 of System 1 cannot communicate with the mobile transceiver means 12 (Mobiles D and E) of System 2. The repeater means 14 use a time slot bus 40 that indicates which channels are free and which channels are busy in the System. The time slot bus 40 allows the Mobiles in either System 1 or System 2 only to communicate with each other within their respective system by identifying a free channel and communicating together on the repeater means 14 associated with that channel. The time slot bus 40, combined with the LTR control message format described below, limit the communication between repeaters in the LTR system to a method for assigning free channels in a group of channels (repeaters) that comprise a given trunked system. There is no provision to communicate information signals (voice/data communication) among repeaters in a trunked system, let alone communicate information signals between repeaters located in different trunked systems.

In the transmission trunked communication system shown in FIG. 3, each of the repeater means 14 is interconnected with a high speed data bus 42 that provides for an improved switching protocol that allows data words to be communicated among the repeater means 14. The control message format of the signaling protocol of the present invention is also significantly changed to incorporate a unique identification for each mobile transceiver means 12 and to implement the priority access scheme, as well as other enhancements to the feature set of radio communication capabilities. In addition, each of the repeater means 14 is also connected by a network bus means 44 with the RNT switch means 10 for the respective trunked system. As described in greater detail hereinafter, the network bus means 44 allows information signals to be communicated among repeaters in a system, as well as allowing both control and information signals to be communicated with another RNT switch means 10, or with an external communication network, i.e., a telephone exchange.

LTR Switching and Signaling Protocol

Figure 4:
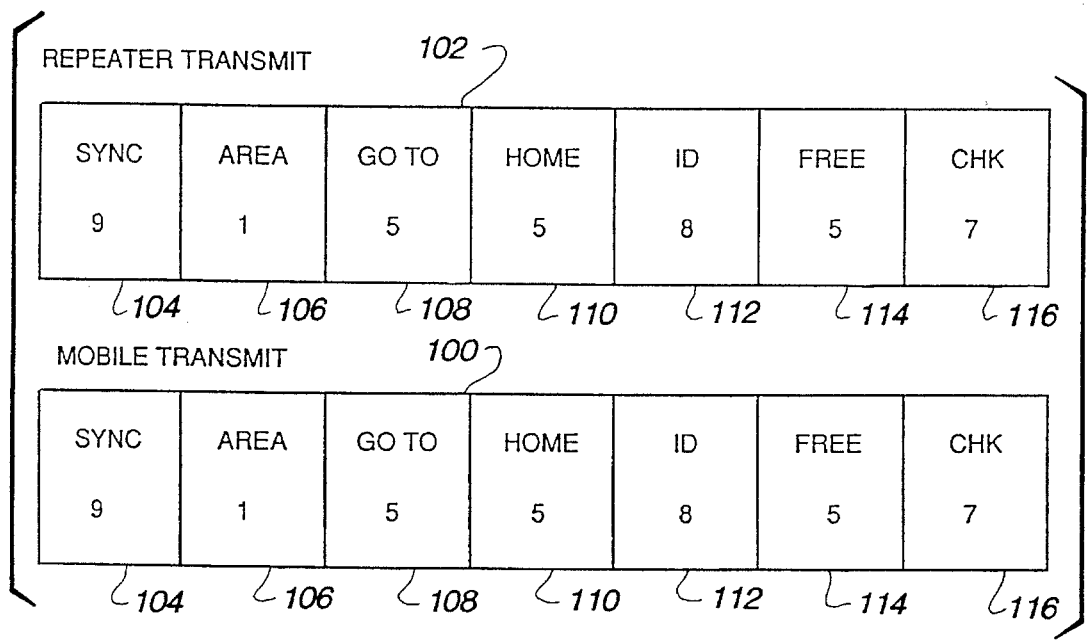
FIG. 4 is a block diagram of the control message used in a conventional transmission trunked land mobile communication system.

Referring now to FIG. 4, the control message formats 100 and 102 for the LTR signaling protocol is shown. In the LTR system shown in FIG. 2, system control is accomplished by sending control messages 100 and 102 shown in FIG. 4 between the repeater means 14 and the mobile transceivers 12 and control stations 18. Control message signaling occupies the subaudio frequencies below 150 Hz of a channel and occurs even when voice or data information is present on the channel. Control messages 100 are continuously transmitted to the repeater means 14 by the calling mobile transceiver means 12 while a conversation is in progress. The repeater means 14 also continuously transmits control messages 102 to the called mobile transceiver means 12, as well as to all other mobile transceiver means 12 monitoring that channel. The specific information in the control message 100 and 102 depends on whether it is repeater or mobile transmitted. The width of each bit in the control message is 3.36 msec (a data rate of approximately 300 baud) and a complete control message for the LTR signaling protocol is transmitted in approximately 135 msecs.

The data fields in the control messages 100 and 102 include:

Sync 104—The first two bits are used to initialize the receive data circuitry of the mobile transceiver. The other bits are used to detect the arrival of the control message 100 and provide bit synchronization.

Area 106—With mobile transmitted control messages 100, this is the area programmed in the mobile; with repeater transmitted control messages 102 messages, it is the bit programmed by the repeater programming switch. If the area transmitted in a control message does not agree with the programmed area, the call attempt will be unsuccessful. This bit is usually coded "0" unless there are two LTR systems close enough to Interfere with each other. In that case, it would then be coded "0" in one trunked system and "1" in the other trunked system.

Go-To 108—In a control message 100 from the mobile, this field contains the number of the repeater (1-20) to which the message is being transmitted. These bits must be the same as the number assigned to the repeater or the message is appearing on the wrong channel because of intermodulation and will be ignored. In control message 102 from the repeater to the mobile, this field contains the repeater number. In control messages to mobiles being trunked out to other repeaters, this field contains the repeater number (channel) to which those mobiles should switch to receive a message. If the repeater is not busy, a control message 102 is transmitted every 10 seconds to keep the mobiles updated. The Go-To 108 field then contains the number of the repeater. When the mobile push-to-talk switch is released, the transmitter remains on for a short time and sends a turn-off code in this field. This code is retransmitted by the repeater and it tells the receiving mobiles to squelch and resume monitoring the home channel. This prevents a "squelch tail" (noise burst) when the transmitting mobile unkeys.

Home Repeater 110—In a mobile-to-repeater control message 100, this field contains the home repeater number of the mobile being called. This number is always the programmed home repeater number In the selected system of the mobile making the call. In a repeater-to-mobile control message 102, this field contains the same repeater number received in the data message from the mobile. If the repeater is not busy, it transmits its own number in this field.

ID Code 112—In a mobile-to-repeater control message 100, this field contains the ID code (1-250) of the fleet or sub-fleet being called. In a repeater-to-mobile control message 102, this is the ID code of the fleet or sub-fleet being called on that channel. If other mobiles assigned to that channel have bean trunked to other repeaters, additional messages are transmitted containing the ID code of these mobiles. In this case, the ID code information is from the repeater time slot bus 40.

Free Channel 114—In a mobile-to-repeater control message 100, this field contains a pass code. In a repeater-to-mobile control message 102, this field contains the number of a repeater that is not busy and is available for service. The free repeater is chosen in a random manner as described in the next section. This information tells mobiles assigned to that repeater which repeater to use to make a call. If a repeater is not busy, it transmits its number in this field. If all repeaters are busy, a "0" is transmitted in this field.

Error Check Bits 116—These seven bits are used as a checksum to check for data errors In a data message. If an error is detected, the message is rejected.

Figure 5:
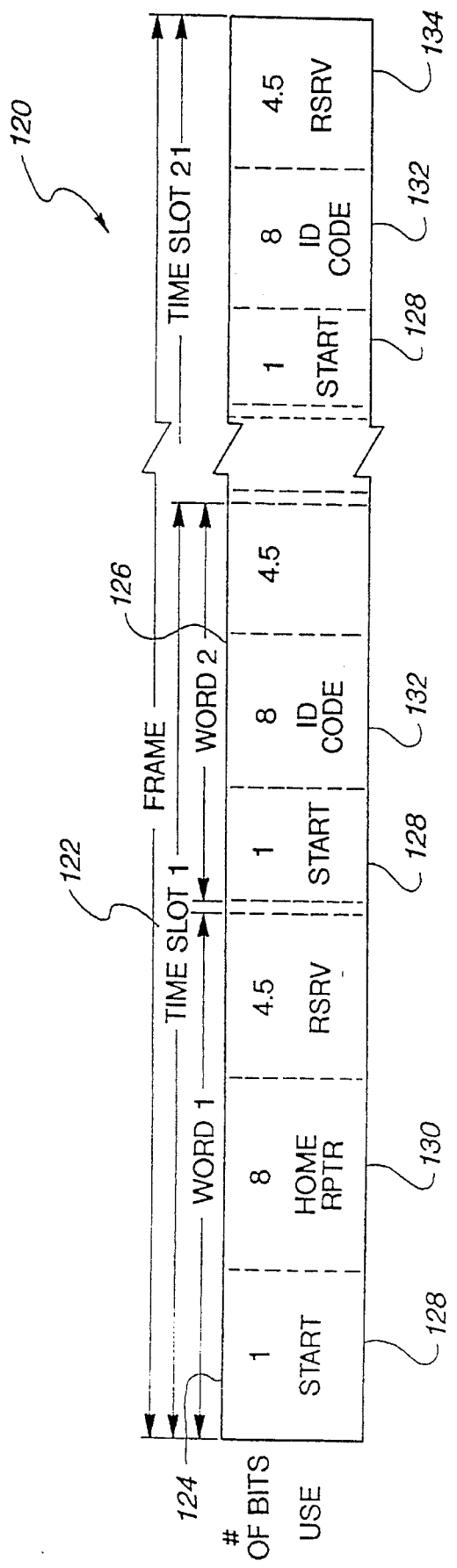
FIG. 5 is a block diagram of the time slot bus used to connect repeaters in a conventional transmission trunked land mobile communication system.

Referring now to FIG. 5, the LTR switching protocol will be described. In a LTR transmission trunked communication system, a single-line serial bus interconnects the logic units of all the repeaters in the trunked system. The serial bus is time-divided to act as a time slot bus 120. One repeater in the system is programmed to generate a synchronization pulse that is used by all other repeaters in the system to determine their time slot 122 on the time slot bus 120. Time slots 1–20 are used by the respective repeaters and time slot 21 is used by the ID Validator. The time slot 122 used by each repeater is determined by the repeater number assigned to that repeater when the programming switch is set. For example, Repeater 1 uses time slot 1, repeater 5 uses time slot 5, and so on. The data rate on the time slot bus 120 is 18,750 baud.

During its time slot 122, each repeater plates information on the time slot bus 120 indicating the status of that repeater. The time slot 122 consists of a first word 124 and a second word 126. If a repeater is not busy, only the start bits 128 appear in the time slot 122. If a repeater is busy, information appears in its time slot 122 identifying the home repeater 130 and ID code 132 of the mobile being called on that channel. If a repeater number is unassigned, nothing appears in the time slot 122. Each repeater monitors all the time slots and if that repeater's number is detected in another time slot, the repeater begins transmitting an additional control message using the signaling protocol described above. This message tells a mobile to go to another channel to receive a message. This additional message is transmitted for as long as the mobile is transmitting on the other channel.

The free repeater indicated In the Free Channel 114 field of control message 102 as shown in FIG. 4 is determined by continuously monitoring information in the twenty time slots 122. The free repeater number changes as these slots are monitored. If a time slot 122 has only start bits 128 indicating an idle repeater, that is the current free repeater. If information in a time slot 122 indicates no repeater or a busy repeater, the free repeater number does not change. For example, assume a five repeater system with repeaters assigned numbers 1, 5, 9, 13, and 17. If repeaters 5 and 13 are busy, the free repeater changes as follows as the twenty time slots are monitored: 1 1 1 1 1 1 1 1 9 9 9 9 9 9 9 17 17 17 17. The free repeater transmitted in the Free Channel 114 field of control message 102 is the free repeater detected at the instant the message is composed.

Although the present combination of LTR signaling protocol for control messages and switching protocol for determining free channels is an efficient means of signaling mobile and assigning free channels in a single transmission trunked communication system, these same protocols have prevented the use of the LTR system as a wide area network capable of providing transmission trunked radio service over a number of coverage zones. In addition to the lack of voice/data communication among repeaters in a trunked system and the inability to communicate either control or information signals between repeaters located in multiple systems, there is no capability to provide for the unique identification necessary to properly interconnect multiple trunked systems together into a wide area network.

Signaling and Switching Protocol of the Present Invention

The signaling and switching protocols of the present invention allow the advantages of the LTR signaling protocol to be retained, while allowing multiple systems of repeaters to be grouped together in a wide area, transmission trunked radio communication system. In addition, an expanded feature set is provided that supports features beyond those features currently available on LTR transmission trunked communication systems. The result is a mobile transmission trunked communication system wide area network that does not need a dedicated control channel because the control signals are transmitted subaudibly, simultaneously with the information signals, that provides a fast access time through the system (approximately 0.5 secs) that will not increase as the number of channels in a system are increased, that provides continuous control signaling to enable mobiles just brought into service or coming out of a fade to begin monitoring a call automatically (this is imperative in public safety systems where the risk of loss of communication in an emergency situation is critical), that has a signaling protocol that is frequency transparent and can be used on different frequency bands, that provides unique identification numbers for each mobile on the entire system, and that encodes the trunked transmissions to prevent unauthorized reception.

Figure 6:
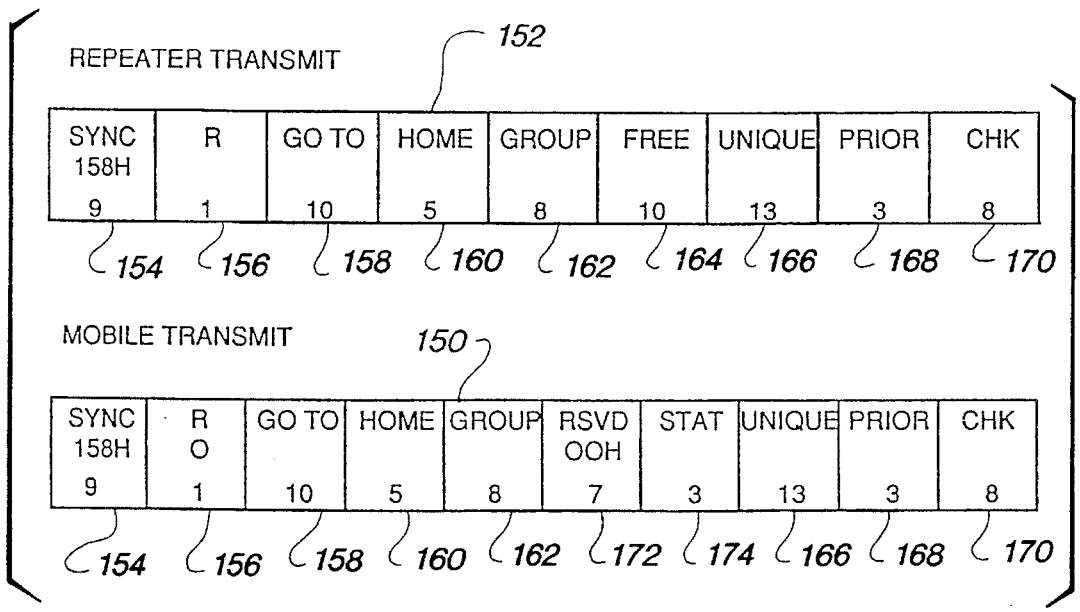
FIG. 6 is a block diagram of the control message in accordance with the present invention.

Referring now to FIG. 6, the control message format for the signaling protocol of the present invention is shown. The data fields in the control messages 150 and 152 include:

Sync 154—The first two bits are used to initialize the receive data circuitry of the mobile transceiver. The other bits are used to detect the arrival of the control message 150 or 152 and provide bit synchronization.

Reserved 156—With mobile transmitted control messages 150, the Reserved 156 bit is always a "0". With repeater transmitted control messages 152, Reserved bit 156 is used to indicate that the control message 152 will not be decoded by the repeater and sent back out. In other words, the Reserved bit 156 indicates that the control message is from the repeater and it is used on critical messages sent from the RNT switch means 10, for example, commands relating to dynamic reprogramming such as disable mobile, reprogram mobile, etc.

Go-To 158—In a control message 150 from the mobile, this field contains the FCC channel number of the repeater to which the message is being transmitted. These bits must be the same as the number assigned to the repeater or the message is appearing on the wrong channel because of intermodulation and will be ignored. Unlike the 5 bit Go-To 108 used in the LTR signaling protocol, Go-To 158 does not require that the mobile be equipped with a predetermined look-up table in order to determine the proper frequency to transmit and receive. The channel number contained in Go-To 158 can be used to directly calculate the transmit and receive frequencies, thereby simplifying the logic in the mobile transceiver. In control message 152 from the repeater to the mobile using the channel, this field contains the FCC channel number. In control messages to mobiles being trunked out to other repeaters, this field contains the FCC channel number to which those mobiles should switch to receive a message. If the repeater is not busy, a control message 152 is transmitted every 10 seconds to keep the mobiles updated. The Go-To 158 field then contains the FCC channel number of the repeater. When the mobile push-to-talk switch is released, the transmitter remains on for a short time and sends a turn-off code in this field. This code is retransmitted by the repeater and it tells the receiving mobiles to squelch and resume monitoring the home channel. This prevents a "squelch tail" (noise burst) when the transmitting mobile unkeys.

Home Repeater 160—In a mobile-to-repeater control message 150, this field contains the home repeater number of the mobile being called (1-30). This number is the programmed home repeater number in the selected system of the mobile making the call and may form a part of the home/group ID of the particular fleet or sub-fleet using the trunked system. In a repeater-to-mobile control message 152, this field contains the same repeater number received in the control message from the mobile. If the repeater is not busy, it transmits its own number in this field.

Group 162—In a mobile-to-repeater control message 160, this field contains the Group ID codes (1-254) of the fleet or subfleet being called. In a repeater-to-mobile control message 152, this is the Group ID code of the fleet or sub-fleet being called on that channel. A portion of the Group ID codes from 225-254 are reserved for special functions as described in greater detail hereinafter. It should be noted that the mobile units can be programmed with a different Group ID encode and decode, depending upon how the particular trunked system is to be configured.

Free Channel 164—In a repeater-to-mobile control message 152, this field contains the FCC channel number of a repeater that is not busy and is available for service. This information tells mobiles assigned to that repeater which repeater to use to make a call. If a repeater is not busy, it transmits its own channel number in this field. If all repeaters are busy, a "0" is transmitted in this field.

Unique 166—In both the mobile-to-repeater control message 150 and repeater-to-mobile control message 152, Unique 166 generally contains the unique ID code of the transmitting mobile or of the transmitting dispatch console. The 13 bits of Unique ID 166 provide up to 8,192 unique identification codes with 0, 8, 164–8191 being reserved for special functions. In special function calls, Unique 166 contains special function data, such as control information for dynamic reconfiguration.

Priority 168—In the mobile-to-repeater control message 150, this field indicates the 5 level APCO (Association of Public Communications Officers) standard priority level assigned to the mobile transmitting the control message. The mobile priority information is also used by the RNT switch to monitor that priority of all of the currently active calls in case the trunked system is full and a dispatch console has requested the RNT switch to force a user off the trunked system to free up a channel for an emergency call. In the repeater-to-mobile control message 152, this field indicates thepriority level currently on the trunked system. If in the last control message 152 that a mobile has received an access priority level for Priority 168 that is higher than the priority level assigned to the mobile, then the mobile will not attempt to use the trunked system.

Figure 8B:
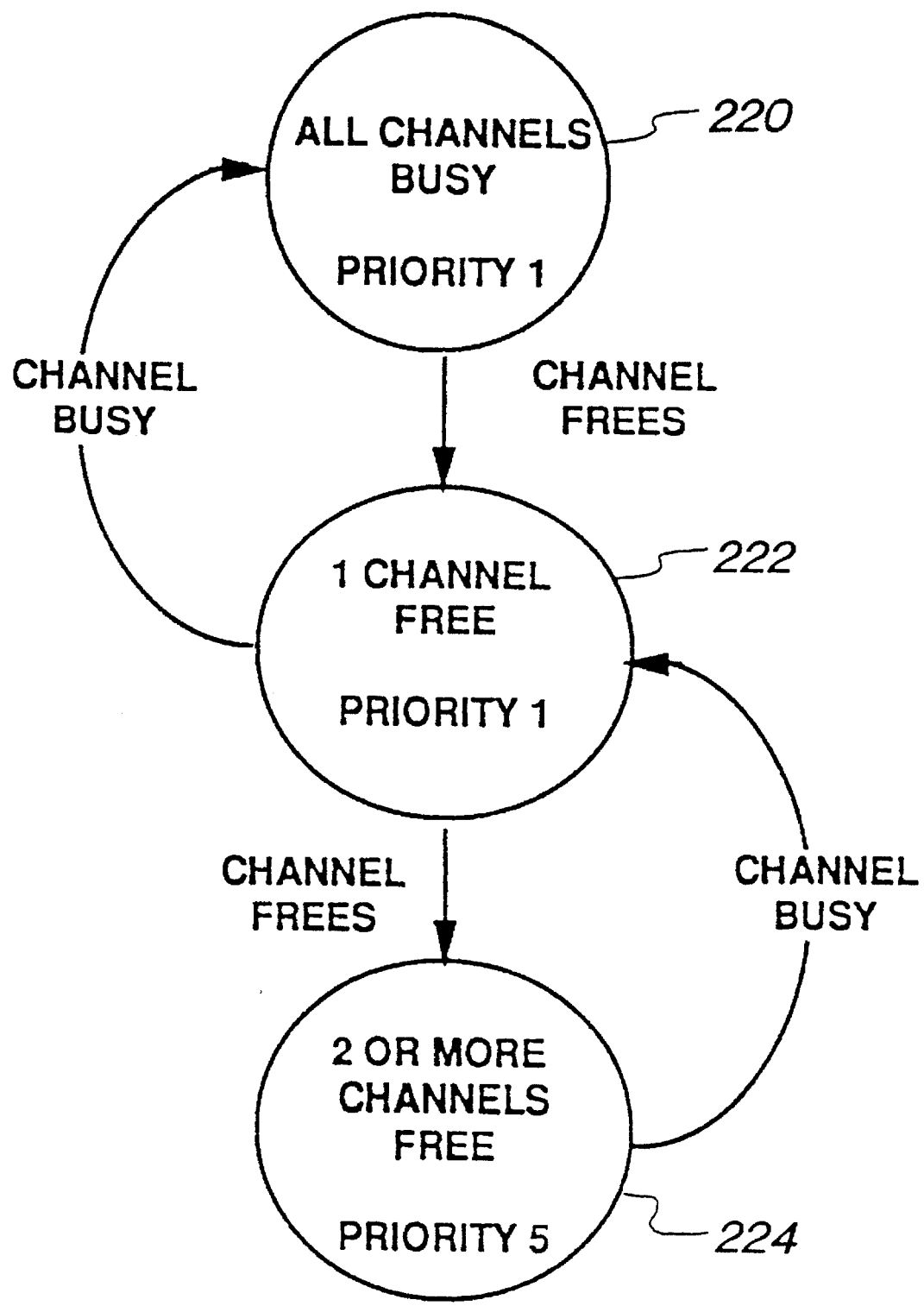
FIGS. 8a–8c are block diagrams showing the three alternate methods of establishing priority access in accordance with the present invention.
Figure 8C:
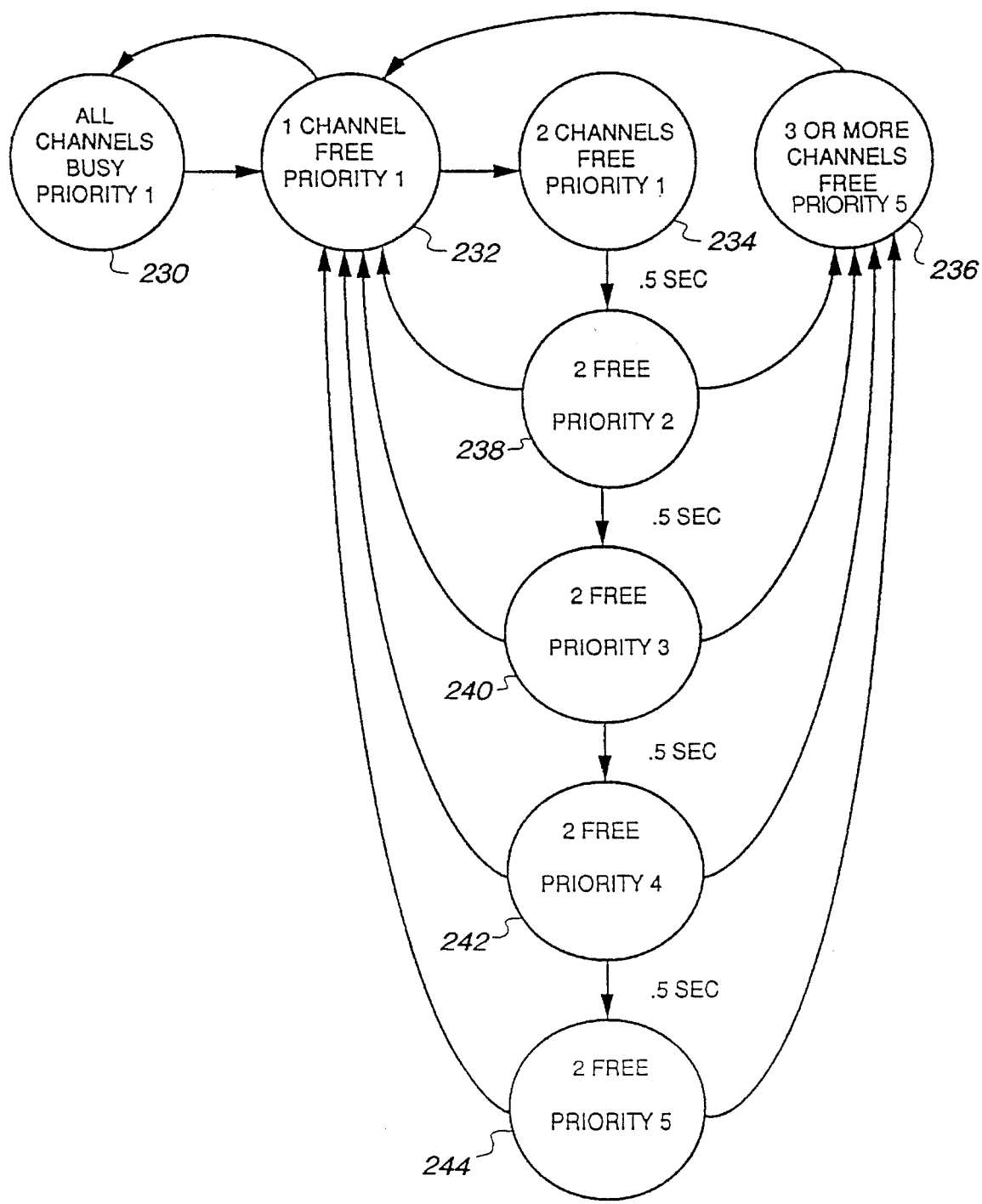
Figure 8A:
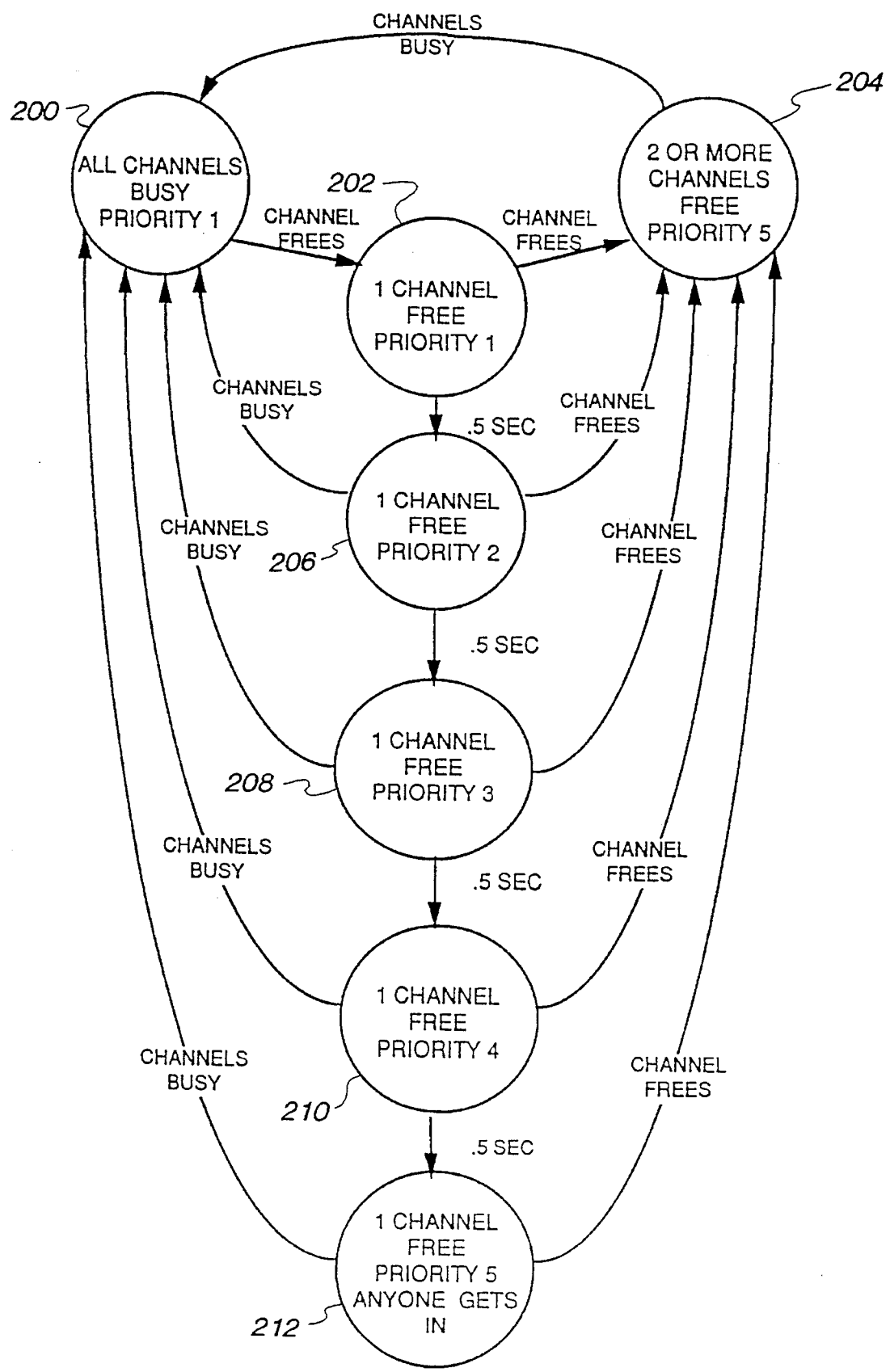

The various methods of using the priority access scheme of the present invention are best understood by reference to the state diagrams shown in FIGS. 8a–8c. In the first case, FIG. 8a, the priority access system is set-up with no channels in the trunked system reserved for emergency or priority use. In this case at State 200, if all channels are busy, Priority 168 is set to "1" and only those mobiles with a priority of "1" will attempt to access the trunked system. If one channel frees up at State 202, Priority 168 remains at a "1". If two or more channels free up at State 204, then Priority is set to "5" and all mobiles may now attempt to access the system. A timed cascading sequence is entered once State 202 is reached such that after each 0.5 seconds of elapsed time without a change in a channel freeing up or becoming busy, the level of priority in Priority 168 is deceased by one to "2" at State 206, "3" at State 208, "4" at State 210, and finally to "5" at State 212 two seconds after State 202 was originally entered. In FIG. 8a, a priority scheme for a trunked system having one channel reserved and two effective levels of priority is shown. At either State 220 or 222, Priority 168 is "1" to Insure that there will be at least one channel open if there is a channel free in the trunked system. At State 224, Priority 168 is set to "5" to allow all users to access the trunked system. In FIG. 8c, a combination of reserved and non-reserved priority schemes is shown where there is one reserved channel and five levels of priority. At States 230, 232 and 234, Priority 168 is "1" to insure that at least one channel will remain free. At State 236, if three or more channels are free, Priority 168 is set to "5" to allow all users to access the trunked system. At State 234, a timed cascading sequence similar to that of State 202 is entered that starts the decrease in priority levels through States 238, 240, 242 and 244, when Priority 168 is set to "5" after two seconds of no new activity on the trunked system.

Chk 170—These eight bits are used as a checksum to check for data errors in a data message. If an error is detected, the message is rejected. The first seven bits of Chk 170 are derived from a truncated BCH (127,120) encoding scheme performed on a selected portion of the control message 150 and 152, as described below. The eighth check bit is a simple parity bit based on the number of bits in the selected portion of the control message 150 and 152 and the 7 BCH check bits. It should be noted that although a known BCH encoding scheme is used, any other type of encoding scheme known in the art could be used as well. In the preferred checksum technique, the eight-bit Chk 170 checksum is used only to detect the presence of errors in the control message and not to correct errors. The eight-bit checksum enables 100% detection of all one-, two-, and three-bit errors and also all odd errors of five bits or greater. In addition, approximately 99.3% of all even errors of four bits or greater are detected.

Unlike the prior LTR signaling protocol, Chk 170 is also used as part of an encryption coding scheme to increase the security of the signaling protocol. A two word system key is provided to each repeater means 14 and transceiver means 12 on the trunked system. This two word key is used to encode and decode each of the transmissions on the trunked system. In the preferred embodiment, prior to computing the checksum, a selected number of bits from the control message are bit-operated on by the first word of the two word key. The preferred bit-operations to encode a bit stream are well known and may include transposition, exclusive or, shifting, or any other equivalent technique. After this step, the entire control message, except Sync 154, is used to compute the eight-bit checksum. With the checksum completed, a second bit-operation is performed on the completed checksum with the second word of the system key to encode it prior to placing the 8-bit checksum in Chk 170. This dual encoding scheme significantly increases the difficulties associated with decoding the transmission because the receiver of the control signal is never sure whether the transmission was a good transmission without bit errors unless the second word of the system key is used to decode the checksum information.

RSVD 172 and Stat 174-152. RSVD 172 is reserved for future expansion and Star 174 is defined to return the current status of the mobile.

Figure 7:
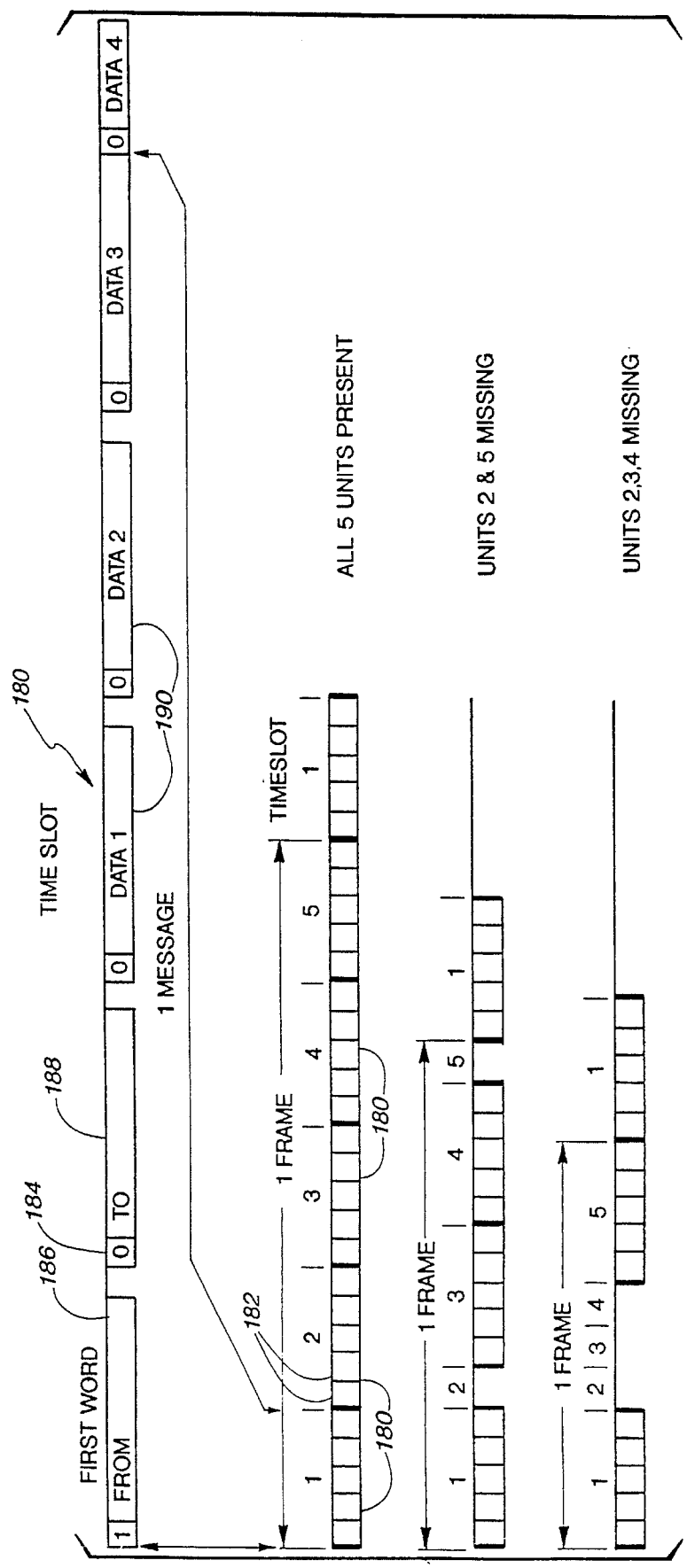
FIG. 7 is a block diagram of the high speed repeater data bus in accordance with the present invention.

Referring now to FIG. 7, the high speed repeater data bus 42 for the repeater means 14 of the present invention will be described. The principal behind the switching protocol for the repeater data bus 42 is to provides a method for a fixed number of repeater means 14 to communicate quickly and efficiently over a common data bus with distributed control and variable time frame, while still maintaining synchronization on the bus. The switching protocol on the repeater data bus 42 is arranged into time slots or messages 180. Each message 180 is made up of a fixed number of words 182 that are in turn made up of a fixed number of bits. An entire group of messages for a particular trunked system is a frame. All of the repeater means 14 monitor the repeater data bus 42 constantly, but transmit on the repeater data bus 42 only during their respective timeslot. In the preferred embodiment, the maximum period for a timeslot is the length of one message 180 (approximately 2.4 msecs), with each message 180 comprised of 6 words 182, each word consisting of a start bit, 8 data bits, a sync bit and a stop bit.

Unlike the switching protocol of the present LTR trunked system, the switching protocol of the present invention does not rely on a fixed number of messages in a frame to determine the position of the time slots in that frame. As explained below, the length of a time slot may be effectively shortened if the repeater means 14 designated to transmit during that time interval is missing from the trunked system by skipping the message 180 associated with the missing repeater. The ability to skip messages 180 in the format of the frames for the signaling protocol of the present invention minimizes the time period of the frame for trunked systems having less than the maximum number of 30 repeaters. It also provides the capability for communicating control signal information among the repeaters without increasing the time period of the frame beyond the point where performance of the entire trunked system is degraded.

The first word 182 of each message 180 is uniquely identified as the first word by the sync bit 184. When the sync bit 184 is a "1", the word 182 is recognized by all of the repeaters means 14 on the repeater data bus 42 as the beginning of a new message 180. For all other words 182 in a message 180, the sync bit 184 is set to "0". The contents of the first word 182 are From 186, the FCC channel number of the repeater means transmitting this message 180. When the sync bit 184 is received by each repeater on the repeater data bus 42, the repeater updates the time slot count of the repeater number to the repeater number in From 186. When all of the words 182 of the message 180 have been received, the time slot count is incremented to look for the repeater number of the next repeater. Thus, if all of the repeaters in a five repeater trunked system are present, the protocol of the repeater data bus 42 would look like that shown in the first frame shown in FIG. 7. If a repeater is not present for a time slot, or if the repeater does not communicate a complete message 180, all of the other repeaters on the trunked system wait for a delay period of a little more than one word and then increment the time slot count to the next repeater. In this way, the time slots associated with missing or defective repeaters can be sequenced through much faster than the normal time period. When one or more of the repeaters are missing, the protocol of the repeater data bus 42 would look like the second or third frame shown in FIG. 7.

The second word 182 of the switching protocol is To 188—the channel number of the repeater to whom the following four Data Words 190 are directed. The remaining four words 182 of the switching protocol are Data Words 190 consisting of R 156, GoTo 158, Group 162, and Unique 166 from the switching protocol described above. The ability to transmit the same information being sent out by one repeater to another repeater in the trunked system allows the trunked system to more efficiently monitor and account for the mobile transceiver in the trunked system.

Also, unlike the Switching protocol of the present LTR trunked system, the switching protocol of the present invention is not dependent upon a specified repeater in the trunked system to send out the sync word of the protocol format. Because each repeater on the repeater data bus 42 is distributively responsible for establishing synchronization with the other repeaters, a repeater may be added to or removed from the trunked system without affecting the operation of the trunked system and without the need to reprogram the repeaters on the trunked system. Moreover, the trunked system is not dependent upon any single repeater to establish the synchronization for the repeater data bus 42. If one repeater was to fall, the rest of the trunked system would continue to operate and, because of the backup home channel feature, the users would notice only a possible small degradation in service because of one fewer trunked channels on the trunked system.

It will be apparent that the signaling and switching protocols of the present invention will allow a variety of features and options to be implemented to establish an expanded feature set for the mobile communication system wide area network of the present invention, including: variable operation, traffic logging, diagnostics, group validation, selective unit disable, dynamic reconfiguration, priority access, redundant repeater control, home channel backup, dynamic channel assignment, and automatic or manual registration.

The home channel backup feature of the present invention assigns a backup channel for each transceiver means 12 on the trunked system. Generally, for each trunked system, one non-home channel will be assigned as the backup channel for all of the home channels on the trunked system. In the event that a transceiver means 12 does not detect any communication on its home channel for a predefined period of time (in the preferred embodiment, approximately 1 minute), the mobile switches to the preassigned backup channel. As the home channel repeater means normally is broadcasting an update control message at least every 10 seconds, if the mobile has not received any communications for the last six update periods it will assume that its home channel has gone off the air and will switch to the backup channel. After switching to the backup channel, if the mobile transceiver does not detect any communication on the backup channel for a predefined time period, the mobile will presume that it has gone out of the coverage zone of the trunked system and, if it has been programmed to do so, will attempt to automatically register on any of the other available trunked systems in the wide area network that the mobile is a user on. If, after switching to the backup channel, the mobile does detect communication, the mobile will use the backup channel as its home channel until such time as the backup channel transmits a control message containing the original home channel of the mobile in the Go-To 158 field. To implement a distributive approach to the home channel backup, the designated backup channel retransmits the home channel update information of all of the home channels for the trunked system at selected intervals on the backup channel. Thus, if the home channel returns to the air after a period of inactivity, it will begin transmitting update information that will periodically be repeated on the backup channel, thereby insuring that each of the mobiles for that home channel will return to their original home channel.

Dynamic reconfiguration of the mobile transceivers in any of the trunked systems of the wide area network of the present invention is accomplished without the need for an exchange of overhead information between the repeater and the mobile by using a select portion of the Group ID's in Group 162 and the unique identification number of the mobile or a data field in Unique 166 to transmit the necessary commands in the control message 152 sent from the repeater to the mobile. In the preferred embodiment, the Group ID's between 230 and 254 are reserved for these special communication functions. The information sent and received in the Unique 152 field will vary depending upon the particular dynamic reconfiguration function being performed.

Figure 18A:
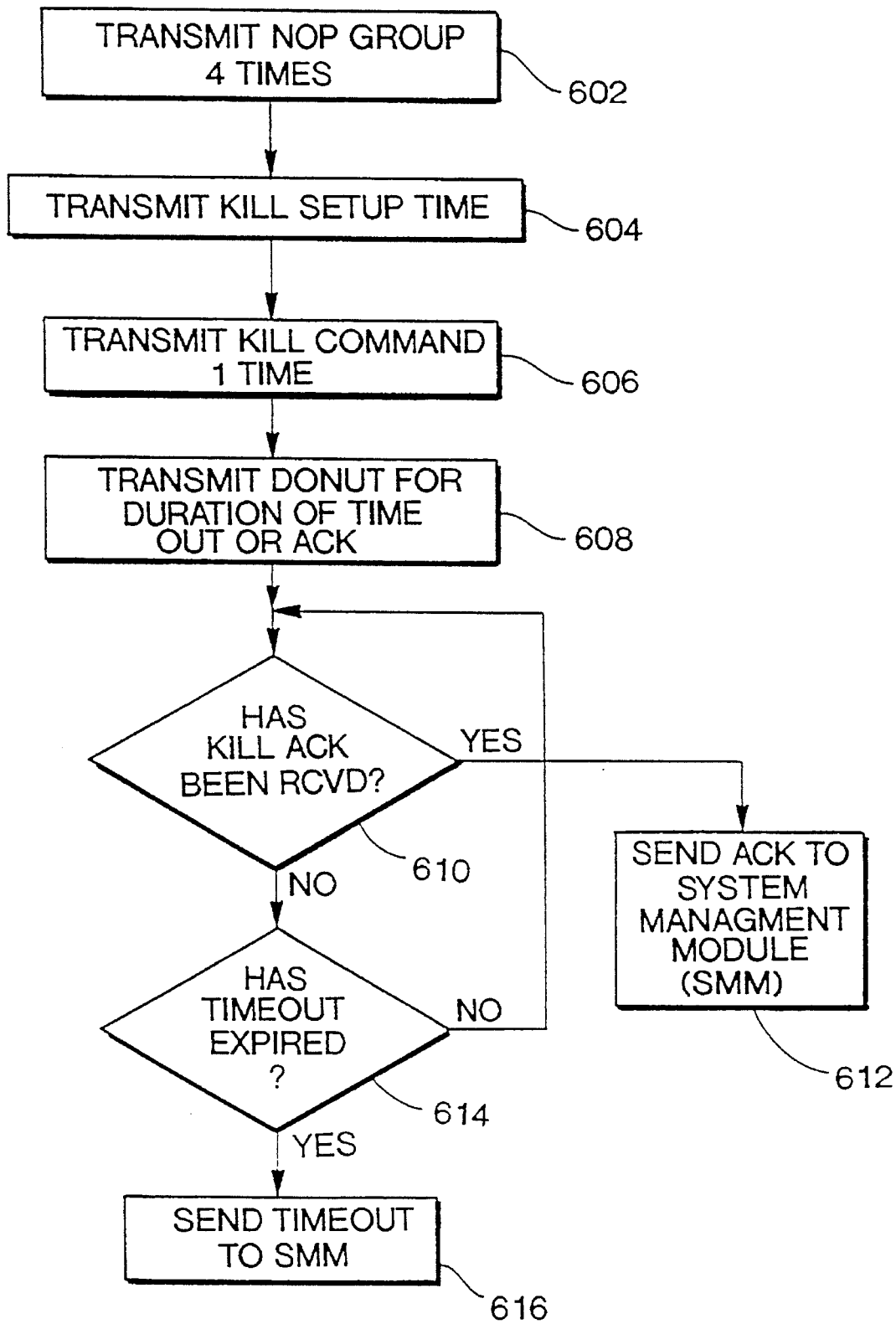
FIGS. 18a–18c are flow diagrams of three dynamic reconfiguration features.
Figure 18B:
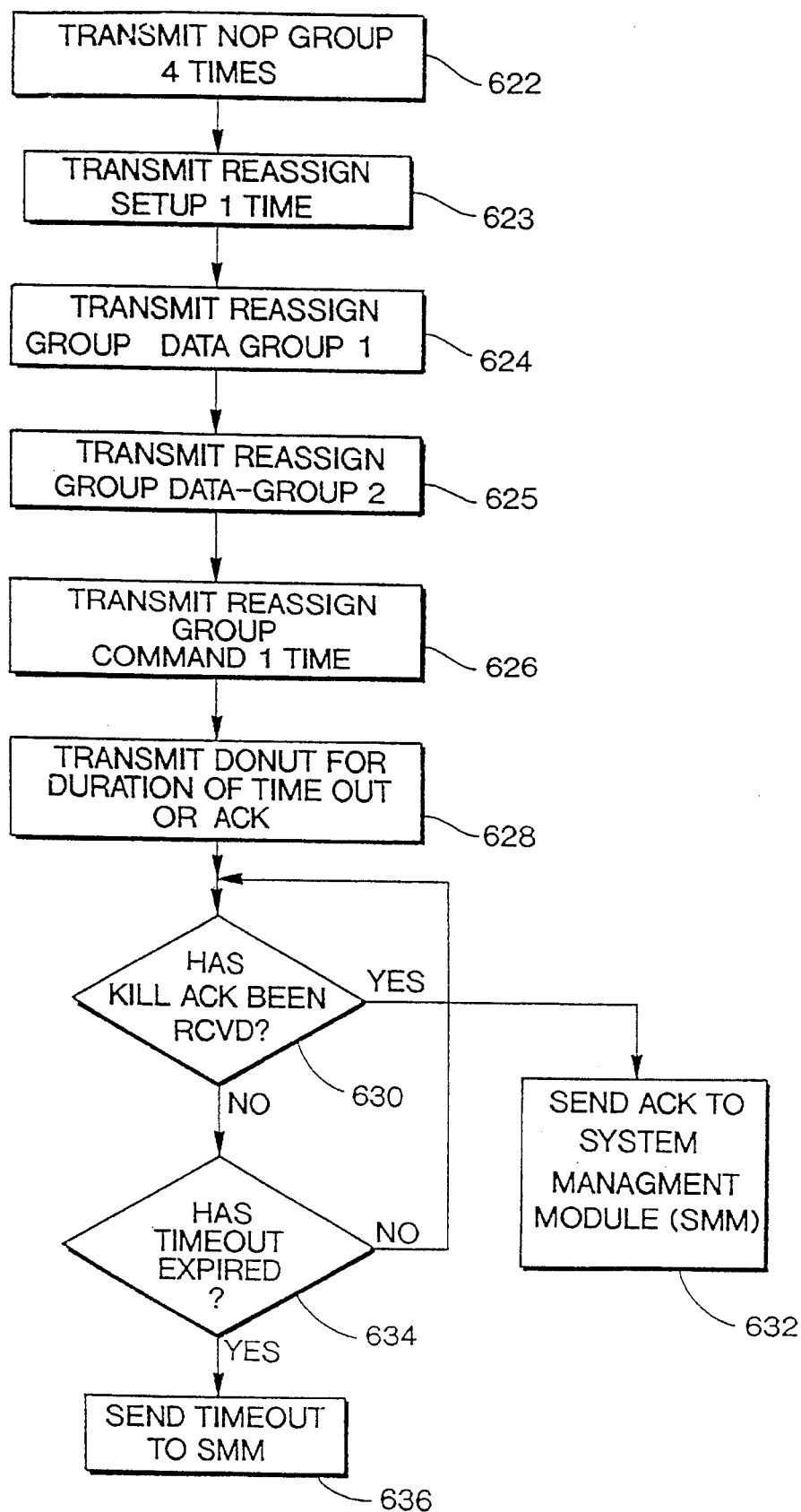
Figure 18C:
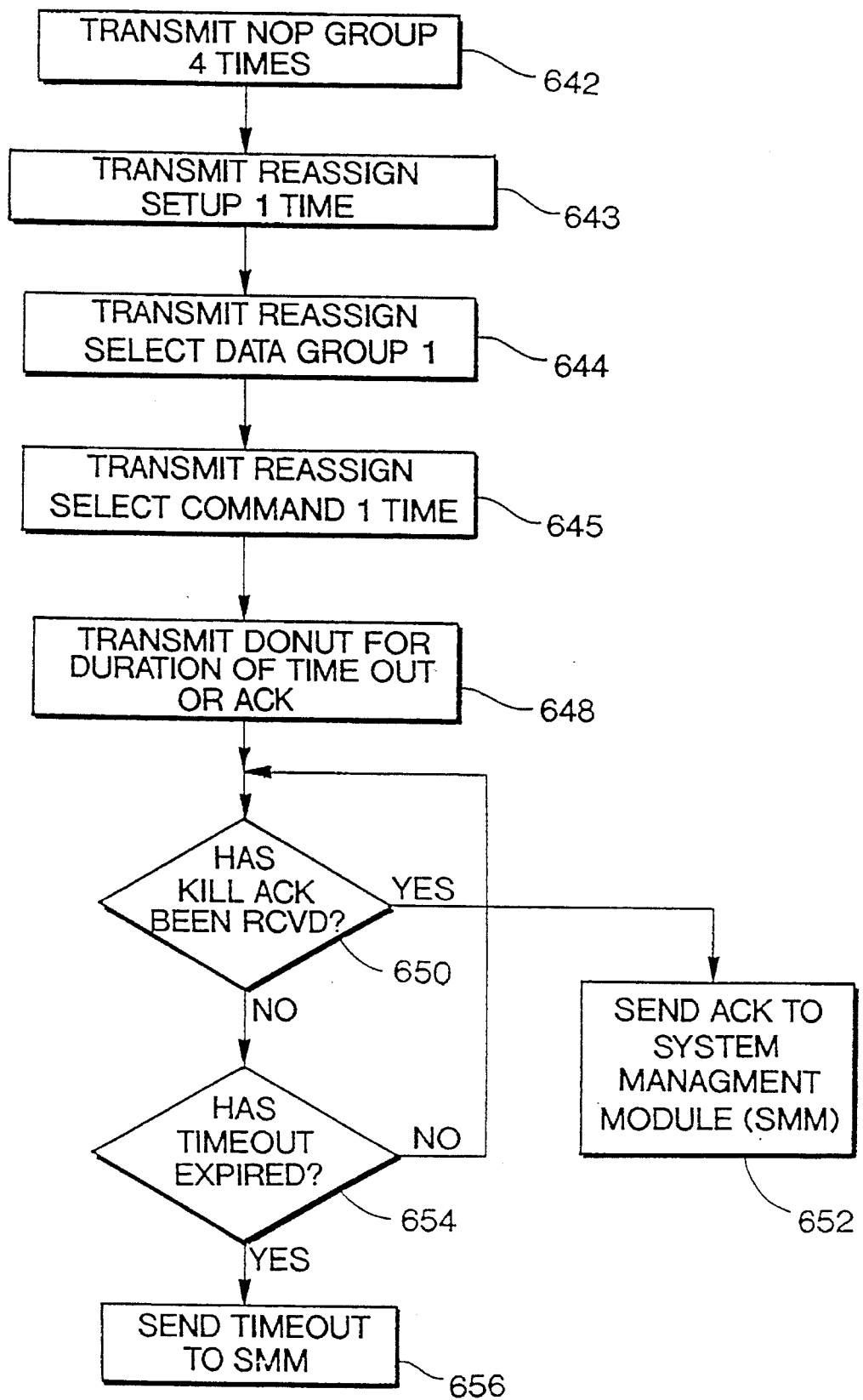

It will be understood that the operation of dynamic reconfiguration on the trunked system requires compatible software programming in both the RNT switch and the mobile, along with reprogrammable memory in the mobile for those functions that will change or reprogram initial or default values that have been stored in the mobile. For example, a given transceiver means 12 is originally programmed with a specific set of authorized groups for the trunked system it will be operating in. These groups a may be stored in a table in memory (i.e., an EEPROM) in the mobile logic unit. If the mobile were to travel out of the coverage zone associated with the trunked system it is assigned to and into another coverage zone, the mobile could also have stored in its memory registration channels associated with adjacent coverage zones that it would allow the mobile to contact those trunked systems. When it is determined that the mobile has left the original zone and entered a new coverage zone, the mobile would contact the trunked system in the new coverage zone and request automatic registration in that zone. The new RNT switch means 10 for that zone would contact the home RNT switch means 10 through the registration means 32 to verify that the mobile was allowed to register in the new coverage zone and inform the home RNT switch means 10 that the mobile had left its coverage zone. Once the mobile is registered in the new coverage zone, the new RNT switch means 10 might reprogram the group that the mobile was associated with might reprogram, The signaling protocol for any of the function includes the same basic steps of: (1) transmitting a NOP special code with the Unique ID of the mobile being reconfigured (this step is repeated four times on the channel of the mobile being reconfigured to insure that if the mobile is in the coverage zone it will receive the command); (2) transmitting one or more of the special Group ID's for the particular command or function being performed and transmitting the appropriate data for that function in the Unique 166 field; (3) transmitting a DONUT (do nothing) special code with the Unique ID of the mobile being reconfigured to indicate that the particular command or function is complete; (4) waiting for a command acknowledgement (if the command was accepted) or a command no-acknowledgement (if the command was rejected) special Group ID to be transmitted by the mobile in response to the particular command or function; and (5) waiting for a timeout condition if no command acknowledgement or no-acknowledgement is received. FIGS. 18a–18c are sample flow diagrams of three types of dynamic reconfiguration, a Selective Unit Disable, a Reassign Group ID, and a Reassign Select Data.

The RNT Switch Means

The Radio Network Terminal (RNT) switch means 10 of the present invention connects several forms of communication systems together in a network system that allows communication between users of the network system and also allows a plurality of network systems to be linked together into a single wide area network The RNT switch means 10 provides the interface to standard communication consoles (dispatch consoles 16 or control stations 18) for central dispatching and control. The RNT switch means 10, in conjunction with the dispatch consoles 16 or control stations 18, provides the mechanism to utilize the expanded feature set of the signaling protocol previously described, including Unit Interrogate, Unit Status, Priority, Dynamic Reassignment, Selective Unit Disable, etc.

Configuration of the RNT Switch Means

Figure 9:
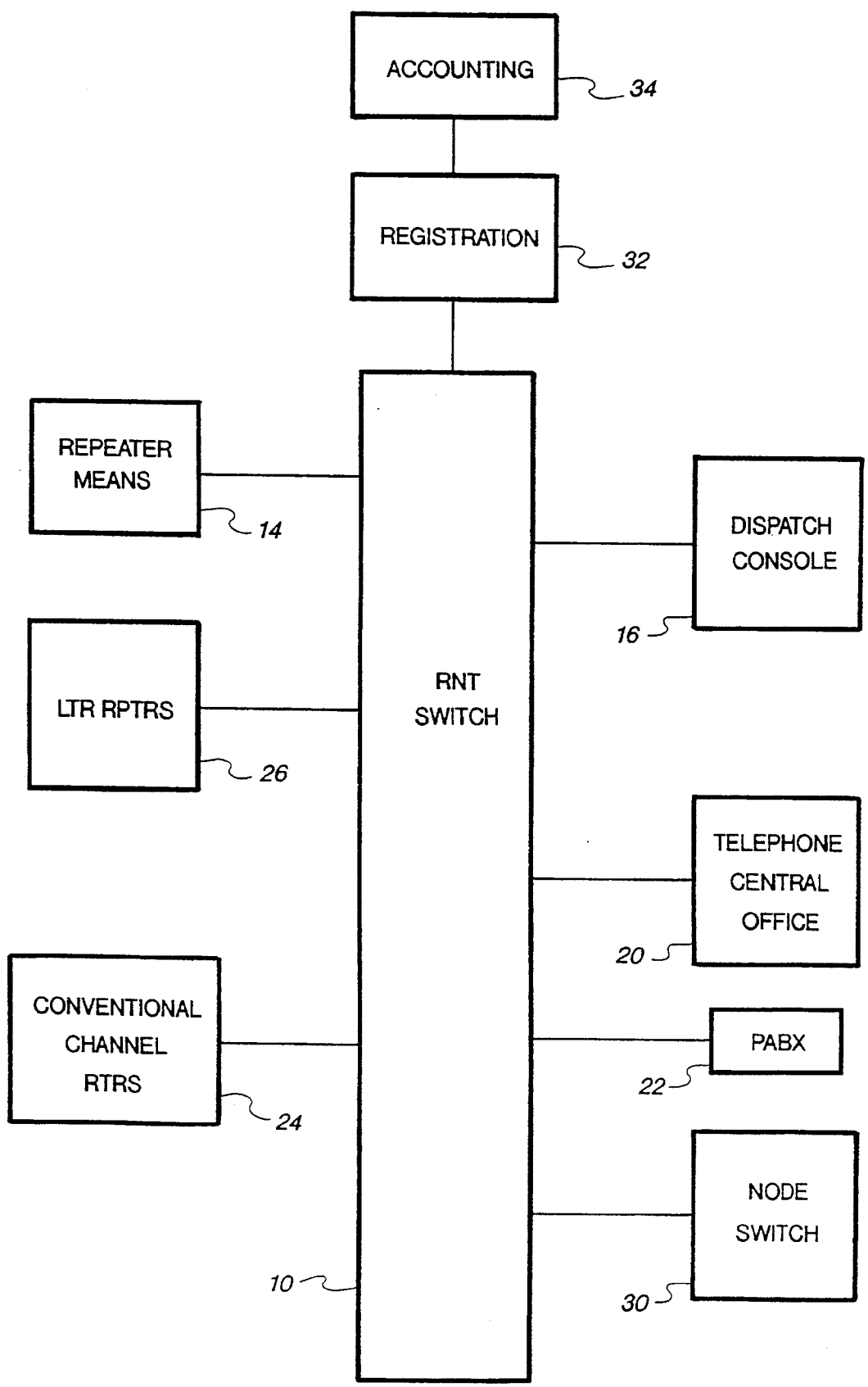
FIG. 9 is a block diagram showing various interconnections of the modules for the RNT switch means in accordance with the present invention.

Referring now to FIG. 9, the various forms of communication systems that are interfaced with the RNT switch means 10 are shown. The RNT switch means 10 is capable of controlling up to 30 channels of radio communications. The channels can be a combination of conventional channel repeaters 24, LTR repeaters 26 or the repeater means 14 of the present invention. The maximum number of each of these types of repeaters is 30 for the conventional channel repeaters 24, 20 for the LTR repeaters 26, and 30 for the repeater means 14 of the present invention. The node switch means 30 allows communication with another RNT switch means 10.

The RNT switch means 10 connects the various communication paths among these elements and gives priority access to the proper modules. System trunking during calls is preserved through the RNT switch means 10 unless fixed by full-duplex or the use of hangtime. Access time for calls to and from any one of the trunked systems is approximately 0.5 seconds, excluding signaling time for external devices such as Tone Remote detection time and the passing of DTMF information. The RNT switch means 10 automatically routes outgoing telephone calls to the telephone central office 20 on the least cost line and produces a traffic accounting record of calls made by Group and/or Unique ID. The record may be accessed by the monitoring means 34 and includes: call time, call duration, telephone number dialed, and if a transceiver means 12 terminated or originated the call. In the preferred embodiment, these records are preserved in non-volatile disk memory.

Wide area coverage between multiple RNT switch means 10 is directed by DTMF entries from either the requesting transceiver means 12 or the telephone control office means 20 or the control stations means 18. Wide area coverage on a group basis within a given RNT switch means is performed by a crosspatch of the dispatch console means 16 to the desired repeater means 14. Wide are coverage on either a group or individual basis outside the RNT switch means 10 is determined by the requesting mobile transceiver means 12 and is established by the node switch means 30.

Figure 10:
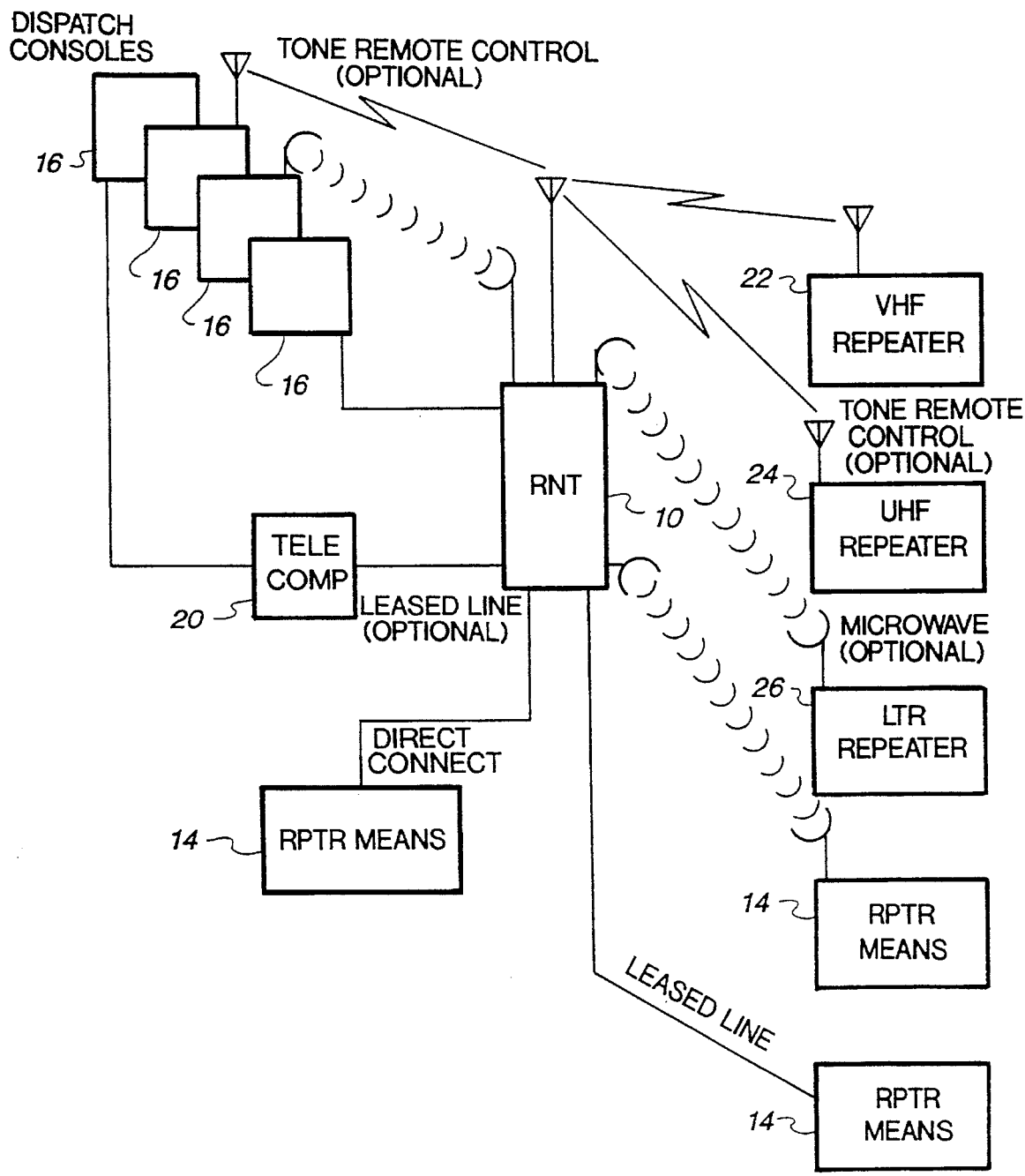
FIG. 10 is a block diagram showing various methods of interconnecting the RNT switch means with the repeaters and the dispatch consoles within a coverage zone.
Figure 11:
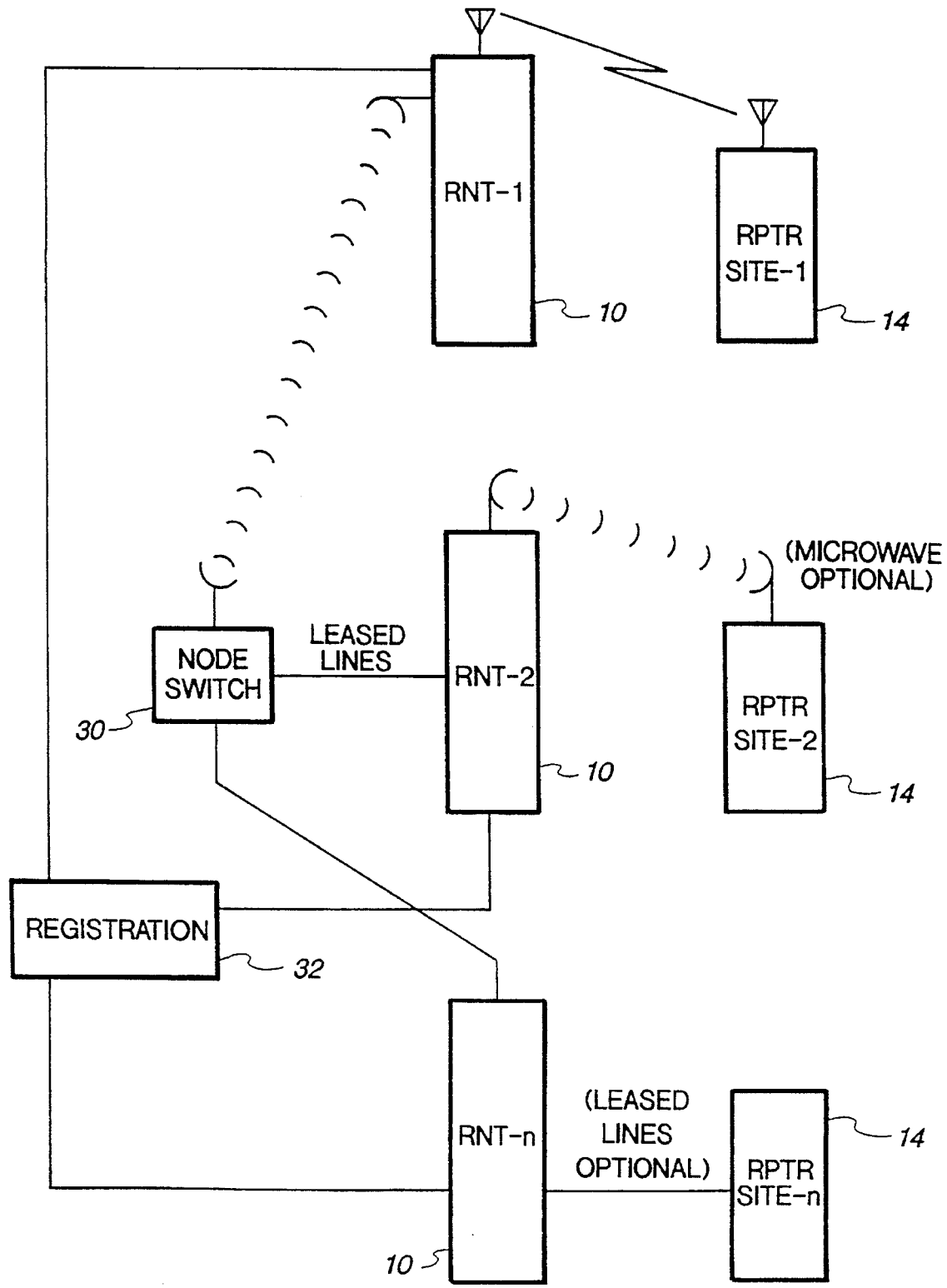
FIG. 11 is a block diagram showing various methods of interconnecting multiple RNT switch means to provide a wide area network of multiple coverage zones.

Referring now to FIGS. 10 and 11, various methods for interconnecting the elements associated with the RNT switch means 10 are shown. In FIG. 10, the RNT switch means 10 is shown as interconnecting by RF communication with conventional channel repeaters 24 (either VHF or UHF), by microwave link with an LTR repeater 26, and by microwave, leased line, or direct connection with the repeater means 14 of the present invention. The RNT switch means 10 may be connected with the dispatch console means 16 by RF communication, by microwave link, by direct connection or by leased line through a telephone interconnect. In FIG. 11, the various methods of linking multiple RNT switch means 10 in a wide area network are shown. The RNT switch means 10 may be connected with the node switch means 30 via microwave link, leased lines or by direct connection. The registration means 32 may also be connected with the RNT switch means by each of these methods. Again, the RNT switch means 10 may be connected to the repeater means 14 by any variety of methods, depending upon whether the repeater means 14 is physically located proximate or distant to the RNT switch means 10.

Architecture of the RNT Switch Means

Figure 12:
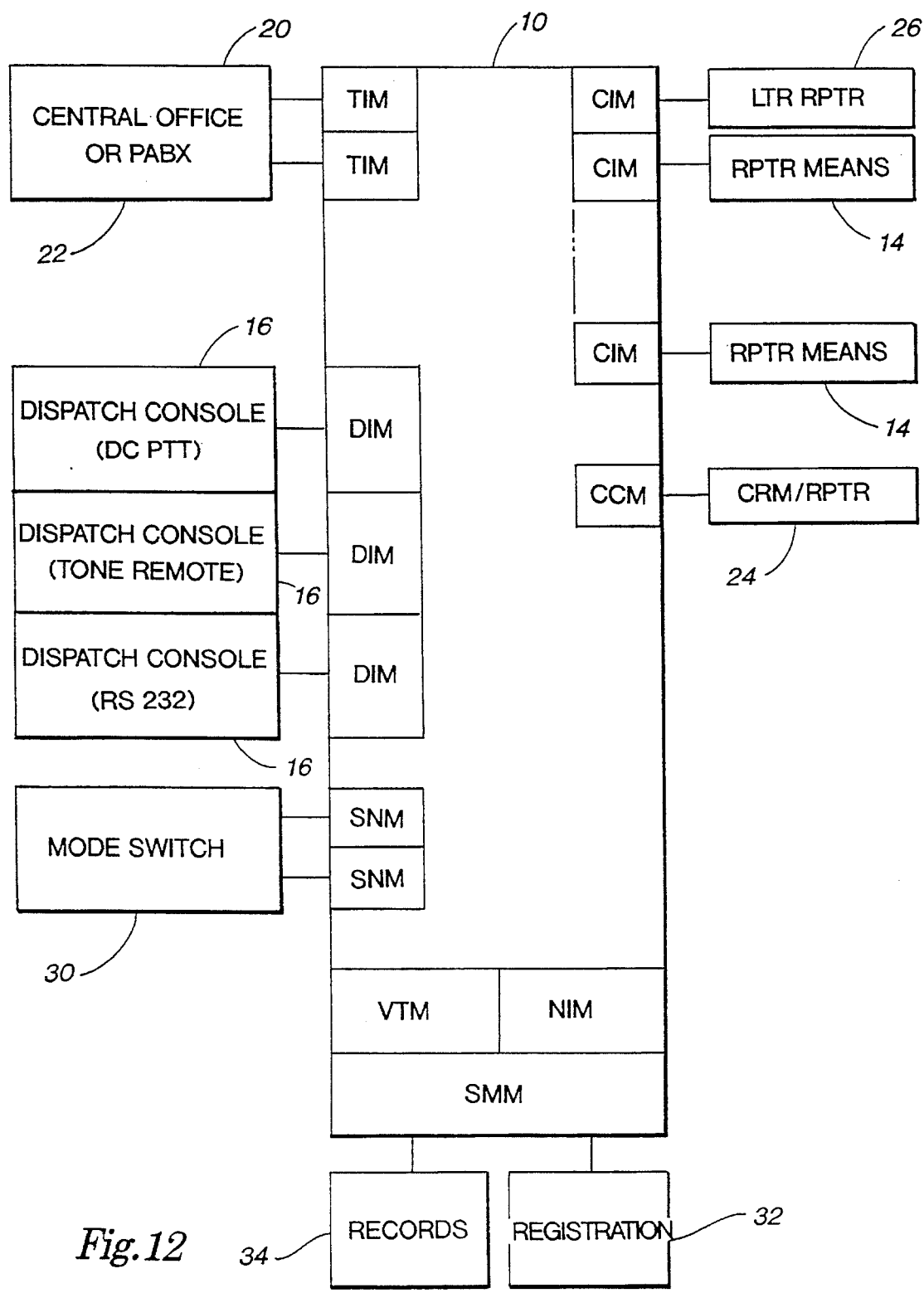
FIG. 12 is a block diagram showing the various modules for the RNT switch means.

Referring now to FIG. 12, the internal architecture of the RNT switch means 10 will be described. The main interfaces to the RNT switch means 10 include the Channel Interface to the various channels, the interface with Dispatch Consoles 16, the interface with the Public Switched Telephone Network 20, the interface to other RNT's via the Node Switch means 30, and the interface to the System Manager. The RNT switch means 10 is constructed of different modules that interface from the RNT switch means 10 to external devices.

The modules as shown in FIG. 12 and described in the following sections are: the Channel Interface Module (CIM), connecting the RNT switch means 10 to the either a LTR repeater or to the repeater means 14 of the present invention; the Conventional Channel Module (CCM), connecting the RNT switch means 10 to a Conventional Channel; the Dispatch Interface Module (DIM), connecting the RNT switch means 10 to the Dispatch Consoles 16; the Telephone Interface Module (TIM), connecting the RNT switch means 10 to the PSTN 20 or PABX 22; the System Network Module (SNM), connecting the RNT switch means 10 to other SNM's, and, via the node switch means 30, to other RNT switch means 20; the Voice Tone Module (VTM), providing voice and tone messages to the RNT switch means 10; the Network Interface Module (NIM), connecting the RNT switch means 10 to the SMM; and; the Switch Manager Module (SMM), providing setup and monitoring capabilities for the RNT switch means 10.

The System Manager Module controls the portion of the RNT switch mean 10 that connects various communication paths by programming various options on the different connections. Programing is done on a computer equipped with a color monitor and sufficient serial ports for communication with the necessary system elements and an option printer. The system manager functions are protected against access by a minimum of one security level. In the preferred embodiment, the SMM is an 80286 based computer, including a keyboard, color monitor; 640K RAM, 1 floppy disk, and a 40 Megabyte hard disk. The functions performed by the SMM include: monitor traffic and produces a usage record; determine channel usage and amount of time all channels in a site are busy in time periods of 6, 10, 15, 30 or 60 minutes; receive notification as soon as a channel or system element failure is detected; program hangtime, initiated on an mobile channel from the switch, to hold a connection on the Trunked System; program a Dispatch Console 16 (equipped with connection control) with the ability to participate in a call; program a Dispatch Console 16 for full duplex communication (the dispatch console 16 informs the system when full duplex communication takes place); program a Dispatch Console 16 for "All Call" transmissions and priority levels (A request for "All Call" transmission acquires all channels in a trunked system for transmission from the dispatch console); program a Dispatch Console with priority levels associated with the Group IDs; initiate ID Validation that determines if a Group or Unique ID is allowed to use the system for voice communication or any operation. and maintain a list of which IDs are enabled or mobile units disabled for operation by the switch; performs dynamic reconfiguration of an mobile unit in the Multi-Net Trunked System; perform least cost routing for outgoing telephone calls.

The Network Interface Module (NIM) interfaces the Switch Management Module (SMM) to the internal communication of the RNT switch means 10. The NIM buffers data communication via a full duplex RS-232 channel on the Intra-terminal Data Bus (IDB) to the System Management Bus (SMB). The NIM is also a buffer between the Channel Status Bus (CSB) to the System Status Bus (SSB). This data is a "snap shot" of the channel activity sent once every two seconds on a RS-232 channel in one direction only, from the NIM to the SMM. The NIM provides the Master Clock and Master Sync for the signaling control of the pulse code modulation (PCM) voice busses. The Master Clock and Master Sync for the PCM busses are redundant in the NIM. A detection circuit monitors the two different sets and if master dock A is off frequency, B is activated. If both A and B are off frequency, an alarm is sent to the SMM and the NIM removes both sets from distribution in the RNT switch. The RNT switch is allowed a Master and Slave NIM, enabled or disabled from operation on the data communication path. The master tells the slave when both its clocks are off frequency and the slave clock is distributed, if the slave clocks are on frequency.

The Channel Interface Module (CIM) connects the RNT switch means 10 to the repeater means 14 and to LTR Repeaters 26. Each repeater means 14 has a CIM that monitors and controls the repeater through a signaling protocol. The CIM controls a LTR repeater means 14 through the Multi-Net Logic Module (MLM). A MLM is the logic drawer in the repeater that interfaces the CIM in the RNT with the receiver and transmitter in the repeater. The MLM is connected to the CIM by 4-wire 600 ohm balanced audio. The MLM is controlled by blank and burst mode, 1200 baud, Audio Frequency Shift Keying (AFSK) data or by digital RS-232 data for both transmit and receive data. The CIM passes information to and from the MLM that controls the repeater and its operation.

The Conventional Channel Module (CCM) connects the RNT switch means 10 to a conventional repeater 24. Each conventional repeater 24 has a CCM that controls the repeater through logic signaling. The CCM controls a conventional repeater through the Conventional Repeater Module (CRM). A CRM is the logic drawer in the repeater that interfaces the CCM in the RNT with the transmitter and receiver in the repeater. The CRM is connected to the CCM by 4-wire 600 ohm balanced audio. The CRM is controlled by blank and burst mode, 1200 baud, Audio Frequency Shift Keying (AFSK) data for both transmit and receive data. The CRM connects to the repeater via 4-wire 600 ohm balanced or unbalanced audio. The CCM reflects the activity of the repeater and acts as a gateway for transmissions between the RNT switch and the conventional repeater, thus allowing the conventional repeater to look like an LTR repeater or the repeater means of the present invention for a given site, home, and group.

The Dispatch Interface Module (DIM) uses one of three methods of interface the RNT switch to the dispatch equipment, Direct Connection, Tone Remote, and Digital Data. A DIM with direct connection is associated with only one group code and uses a form of Type II E & M lead input similar to the mobile PTT. A DIM with tone remote connection decodes guard tone for the PTT Indication and decodes DTMF to select from one of ten group codes. A control sequence uses the DTMF to place the DIM in scan mode or to stop and use a specific group code. The tone remote feature requires the use of an add on personality card. The most versatile DIM has a digital-data connection that requires a separate full duplex 9600 baud, RS-232 channel. The separate data path is required because the intelligent dispatch console can monitor and display the information of the system. The information exchanged between the DIM and an intelligent dispatch console contains what the DIM receives and transmits. The DIM connects the 4-wire 600 ohm balanced audio with the Pulse Code Modulation (PCM) data paths and communicates to other modules via the Intra-terminal Data Bus (IDB). The DIM also monitors the Channel Interface Module (CIM) Channel Status Bus (CSB) to determine if a CIM 1s active with a DIM group: Some of the functions performed by the DIM include: unique ID display: status display: unique ID calling: emergency display: emergency answer: site select calling; interrogate—static and dynamic.

The Trunk Interface Module (TIM) connects the RNT switch to the telephone lines and handles telephone line protocols. The TIM logic unit is microprocessor controlled and communications to the Switch Management Module (SMM) via the intra-terminal data communications. A RNT may have multiple TIMs with varying styles of telephone lines attached, for example, connection to Central Office, or connection to PABX system. The telephone line audio is processed to interface with the Pulse Code Modulation (PCM) voice path. The basic TIM operation functions are: Signaling, Call Supervision and Intra-terminal Communications.

The System Network Module (SNM) is the interface that allows Unique ID calling from mobile units and multiple RNT switches to be connected in a total wide area network. The SNM uses a 4-wire 600 ohm balanced audio on the interface and connects audio to the PCM data paths. The SNM also uses a Type II E&M lead connection set for connection initiation and supervision. The SNM communicates with other modules via the Intra-terminal Data Bus (IDB) and monitors the Channel Status Bus (CSB) for the group set up to use the SNM. The RNT switch may be one terminal in a multiple terminal system created by connecting the RNT switch via the SNM, through a 4-wire E&M lead interface, to a system switching node or Private Automatic Branch Exchange (PABX). The SNM can dial pulse or DTMF the desired site, another SNM interface in the same RNT switch or in a different RNT switch. SNM's pass information on the interface relative to the type of call desired and connection status of the end device using Audio Frequency Shift Keying (AFSK) in a blank and burst mode. This form of data passing allows a standard 4-wire interface connection and does not require a specialized system switching node.

The Voice Tone Module (VTM) provides tone and voice messages to modules that indicates call progress to the users. The VTM contains 8-fixed slots of digitized PCM audio messages stored in PROM that are 4-seconds in length and repeat continuously on the VTM PCM bus of the RNT switch. The start of the message is indicated in the transmission so modules can present the audio message to the user from the beginning of a message. There may be up to four VTMs within a system, depending upon the messages required.

Figures 1, 13A:
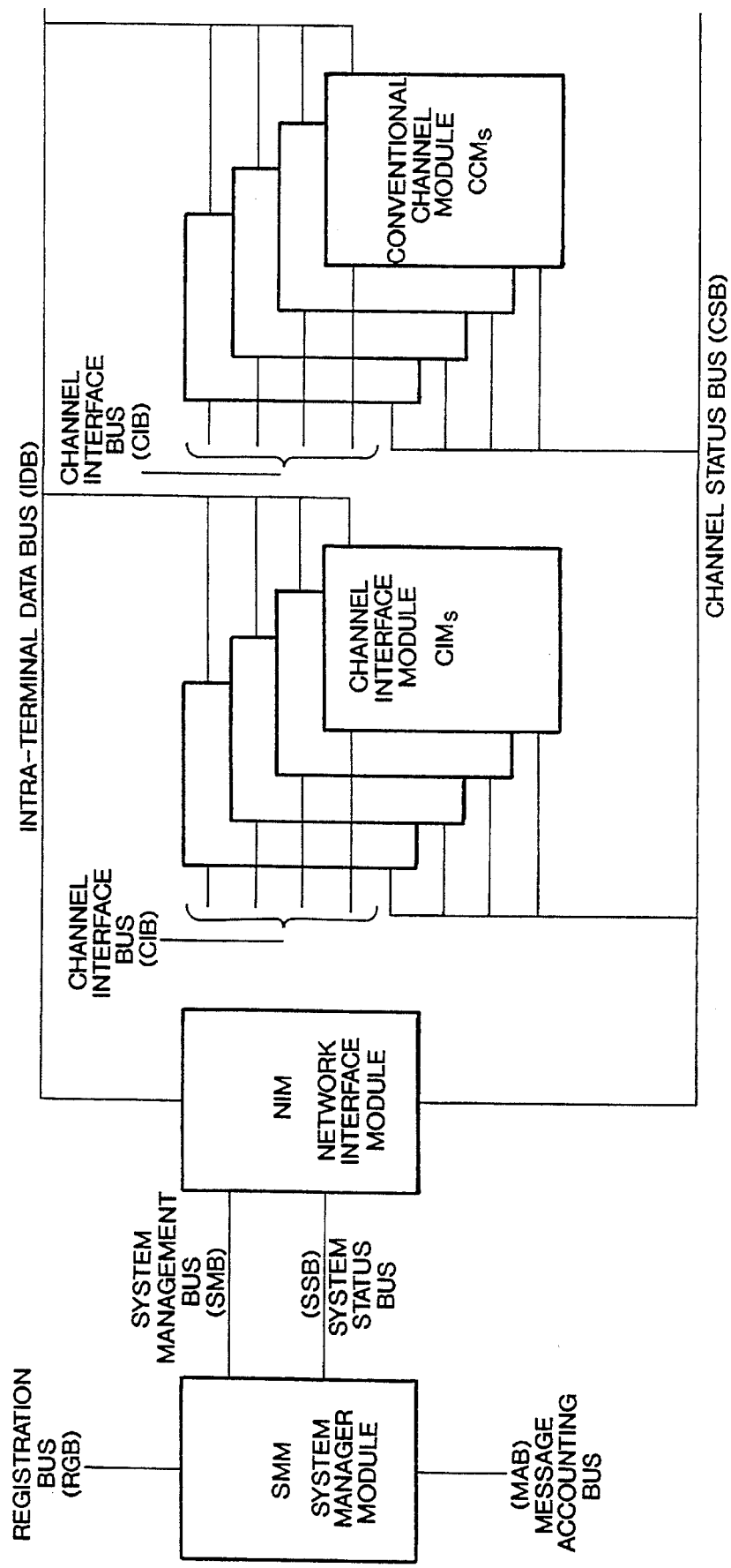
FIGS. 13a–13c are block diagrams of the data, control and voice bus structures of the RNT switch means.
Figures 2, 13A:
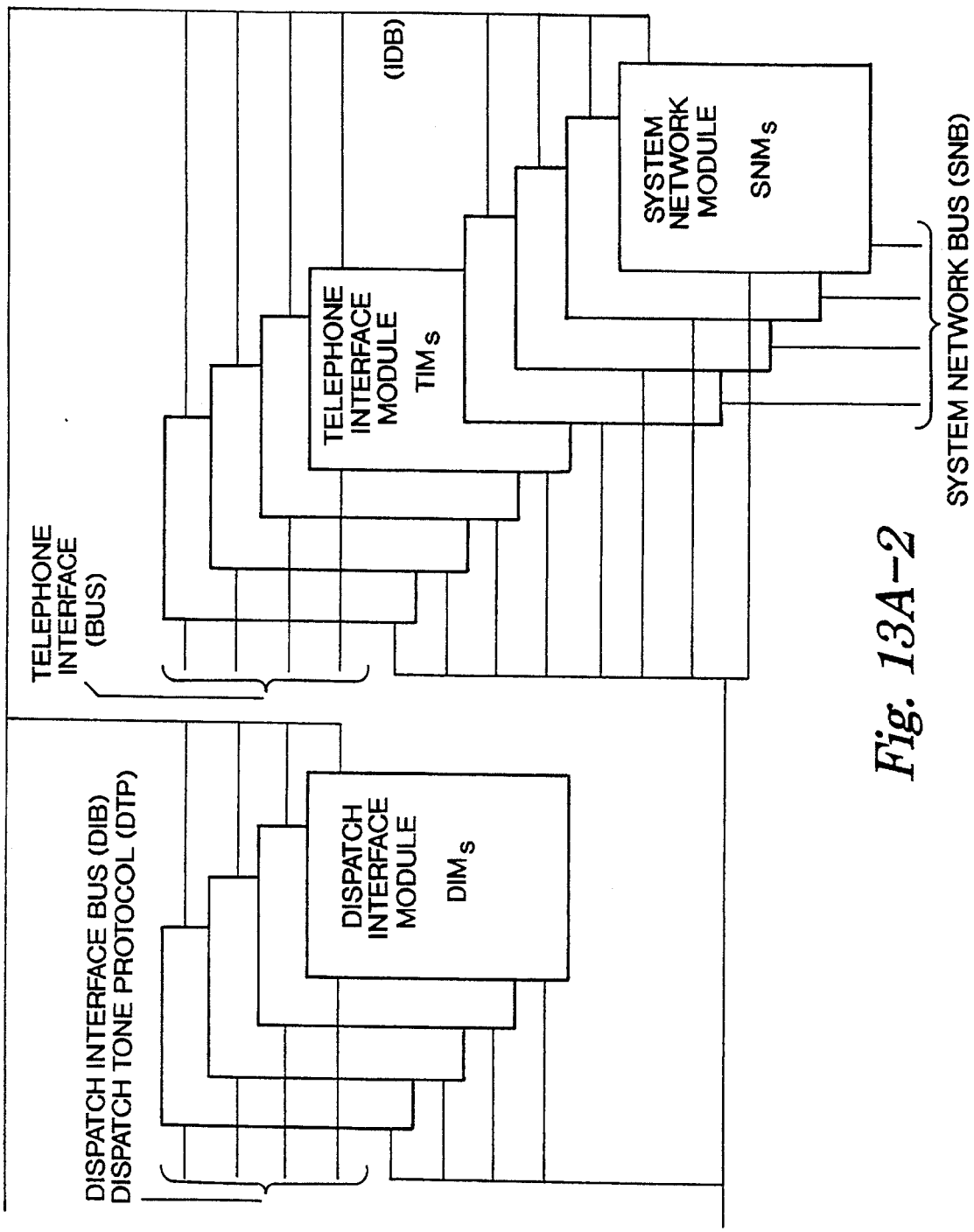
Figures 1, 13B:
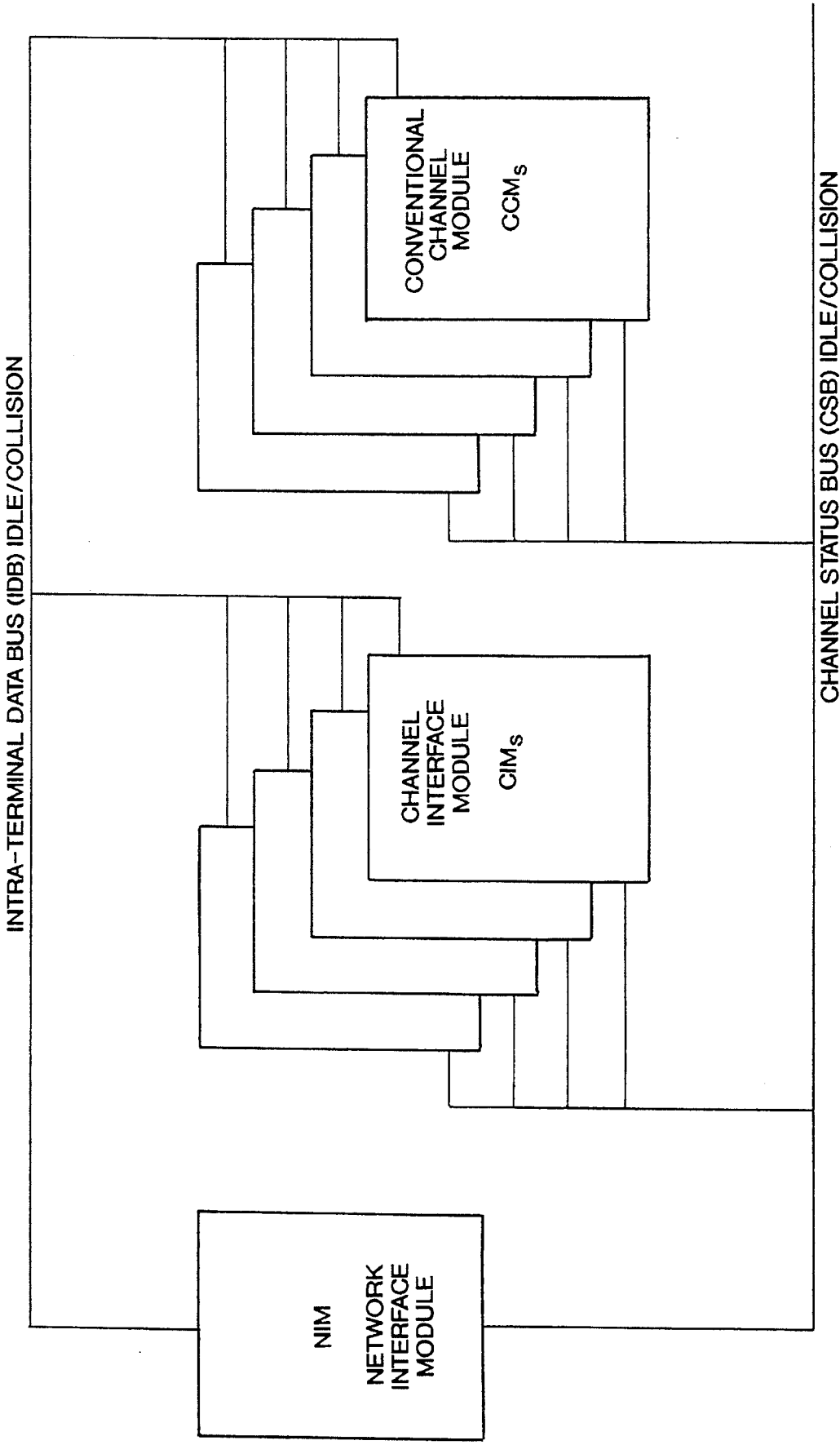
Figures 2, 13B:
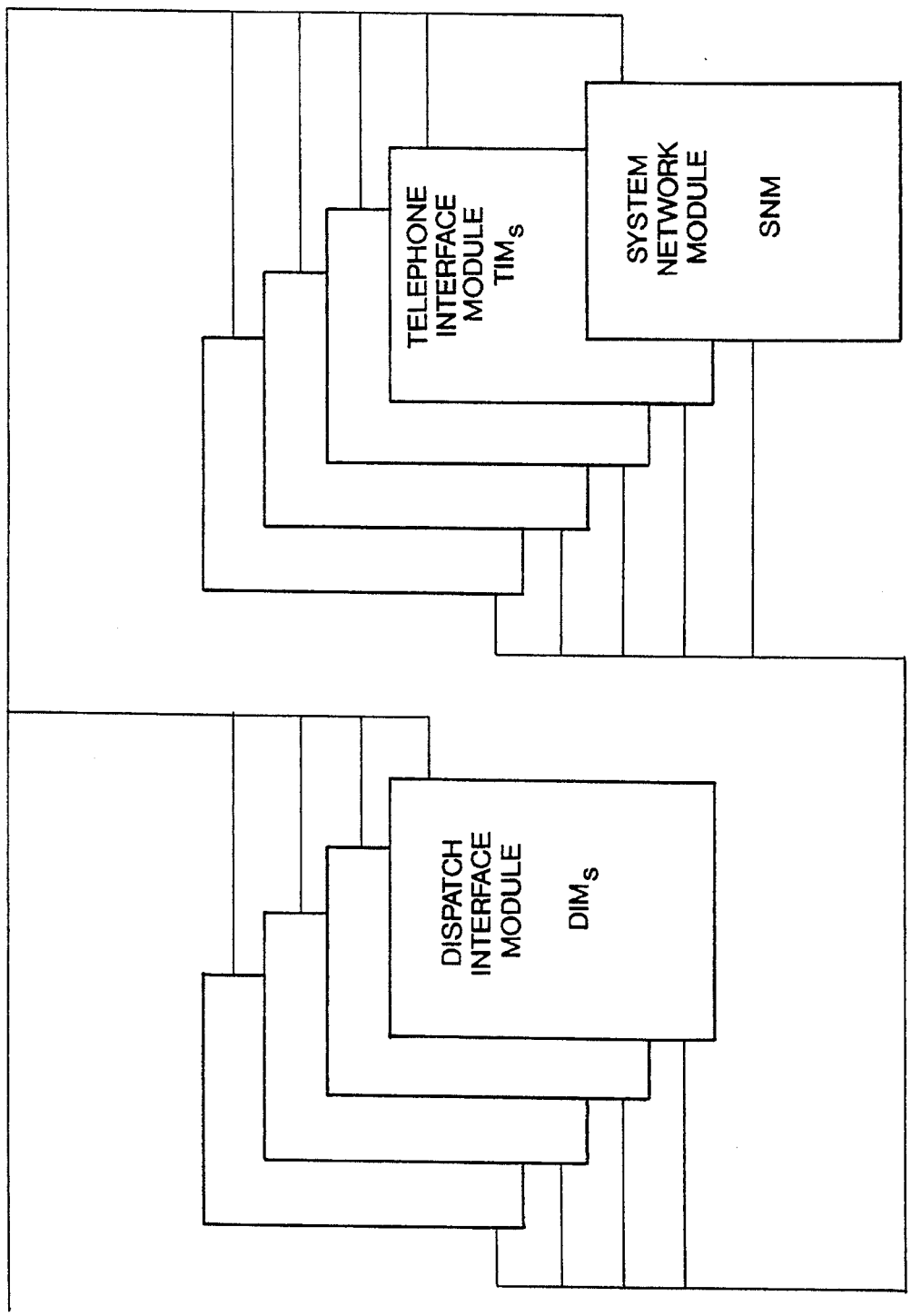
Figures 1, 13C:
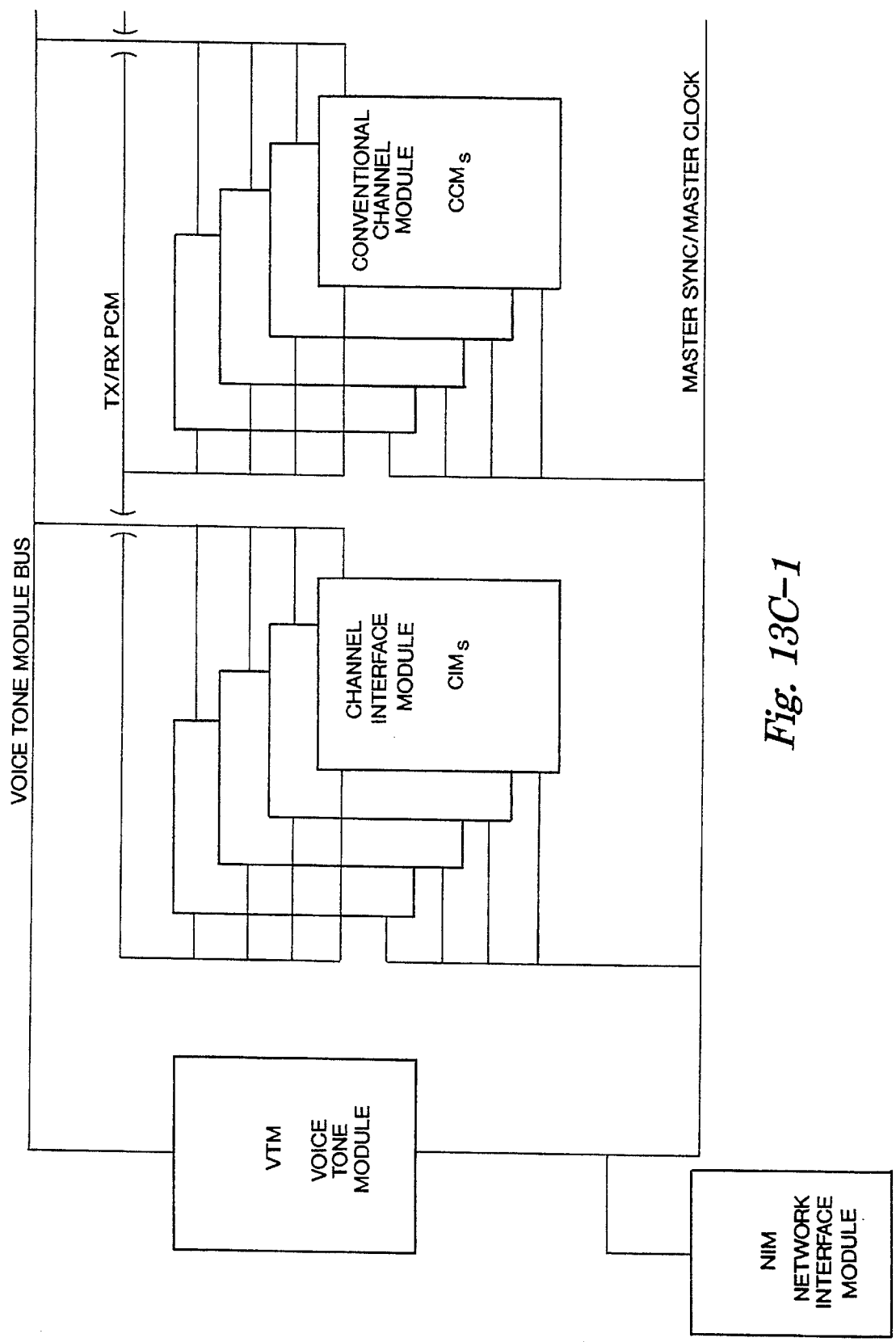
Figures 2, 13C:
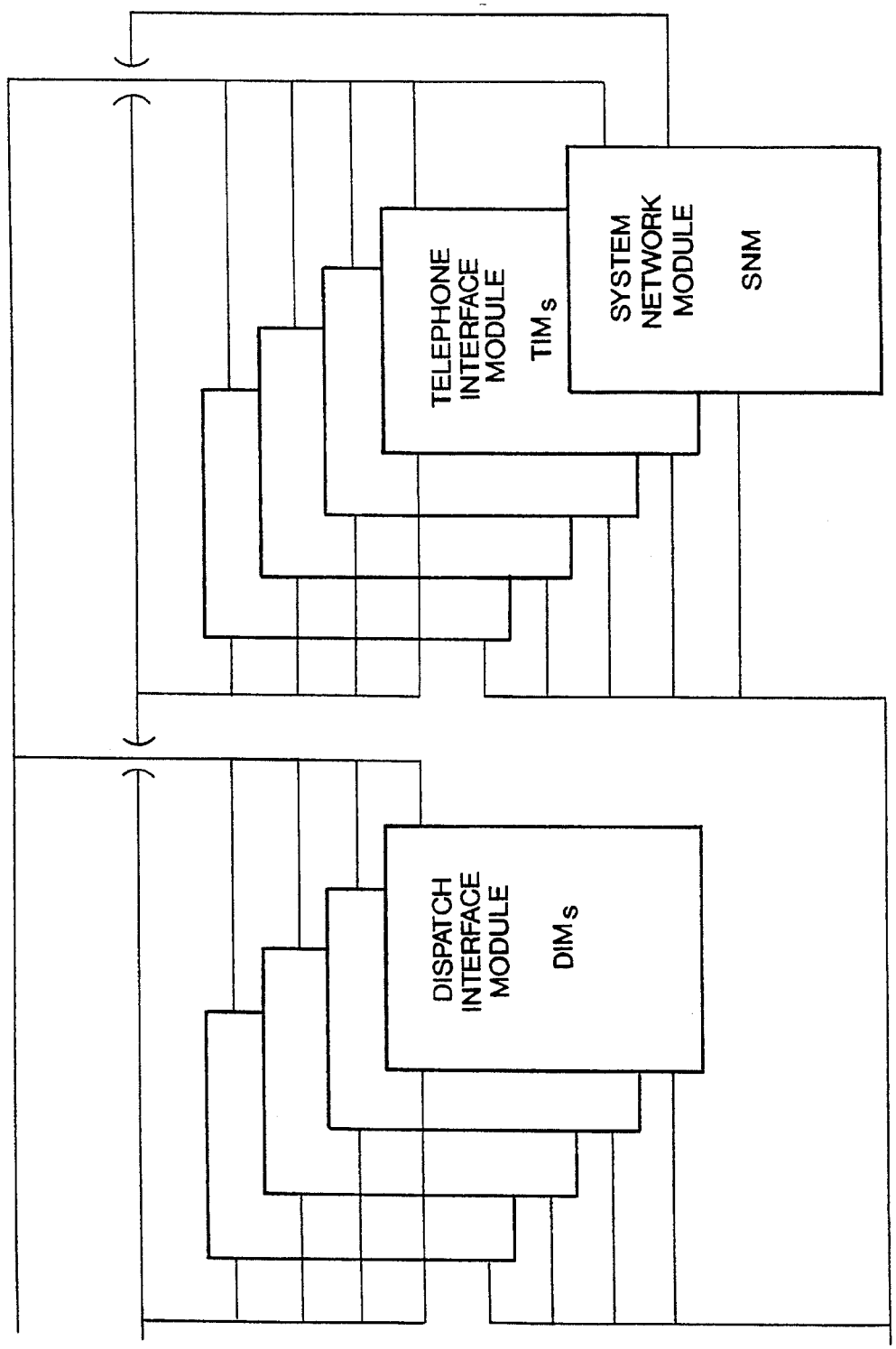

The various bus means that interconnect the modules of the RNT switch means 10 are shown in FIGS. 13a–13c. Together, these busses comprise the network bus 44 that links the various modules in the RNT switch means 10 to one another and to the repeater means 14. FIG. 13a shows the interrelationship of the various modules and the data busses. The Message Accounting Bus (MAB) is a 9600 baud bus with a sync-escape protocol. The MAB passes information of the system call status once a second, telephone accounting data, and error records. The Channel interface Bus (CIB) is a 1200 baud sync-escape protocol bus that passes system channel control and status to and from the CIM. The Channel Status Bus (CSB) is a 19200 baud sync-escape protocol bus that passes channel status from channel modules to other system modules. The Dispatch Interface Bus (DIB) is a 1200 baud syncescape protocol bus that passes DIM control and status to and from the Dispatch Consoles. The Dispatch Tone Protocol (DTP) passes industry standard tone remote push-to-talk tone and DTMF for DIM control and status to and from the dispatch consoles. The Intra-Terminal Data Bus (IDB) is a 19200 baud sync-:escape protocol bus that modules communicate on to pass control information to each other. The System Network Bus (SNB) is a 1200 baud sync-escape protocol bus that passes control and status from one SNM to another. The System Management Bus (SMB) is a 9600 baud syncescape protocol bus that passes information from the SMM to and from the other modules via the NIM. The System Status Bus (SSB) is a 9600 baud sync-escape protocol bus that passes the CSB data to the SMM or external peripheral equipment once every 2 seconds via the NIM. The Registration Bus (RGB) is a 9600 baud syncescape protocol bus that passes the mobile unit registration information to and from the registration system.

Referring now to FIG. 13b, the control busses used to control the flow of data and voice information in the RNT switch means 10 are shown. The IDB Idle/Collision line is a three level line that indicates if the line is idle, busy or collision occurred for the IDB communication process. The CSB Idle/Collision line is a three level line that indicates if the line is idle, busy or collision occurred from the CSB communication process.

In FIG. 13c, the voice busses that pass information signals (either voice/data) The VTM Bus is a 2.048 MHz Pulse Code Modulated (PCM) bus containing 32 slots of tones or voice the modules use to indicate call progress to an end user by means of audio information. The Tx PCM bus is a 2.048 MHz Pulse Code Modulated (PCM) bus containing 32 slots. Audio received from the mobile channel is transmitted on these slots by the channel modules and received by the other system modules. The Rx PCM bus is a 2.048 MHz Pulse Code Modulated (PCM) bus containing 32 slots. Audio is transmitted from the other system modules to these slots and received by the channel modules to be transmitted on the mobile channel. The Master Sync provides the synchronization signal for the PCM bus communication to begin the frame of 32 PCM slots. The Master Clock provides the 2.048 MHz clocking signal for the PCM busses.

For a more detailed technical description of the circuitry associated with the RNT switch means 10, as well as a more derailed description of the operation and setup of the RNT switch means 10, reference is made to the reference is made to the description of the operation of the E. F. Johnson Multi-Net™ system contained in the manual entitled "Multi-Net™ Radio Network Terminal Service Manual", Part No. 001-3039-001 (Rev. 1, Mar. 1989), which will be available from E. F. Johnson Company, Waseca, Minn., a copy of which is attached as Appendix B and is fully incorporated by reference herein.

Mobile Transceiver Operation

The operation of a mobile transceiver 12 within the distributive wide area network transmission trunked communication system of the present invention will now be described with reference to the flow diagrams depicted in FIGS. 14–17.

Figure 14:
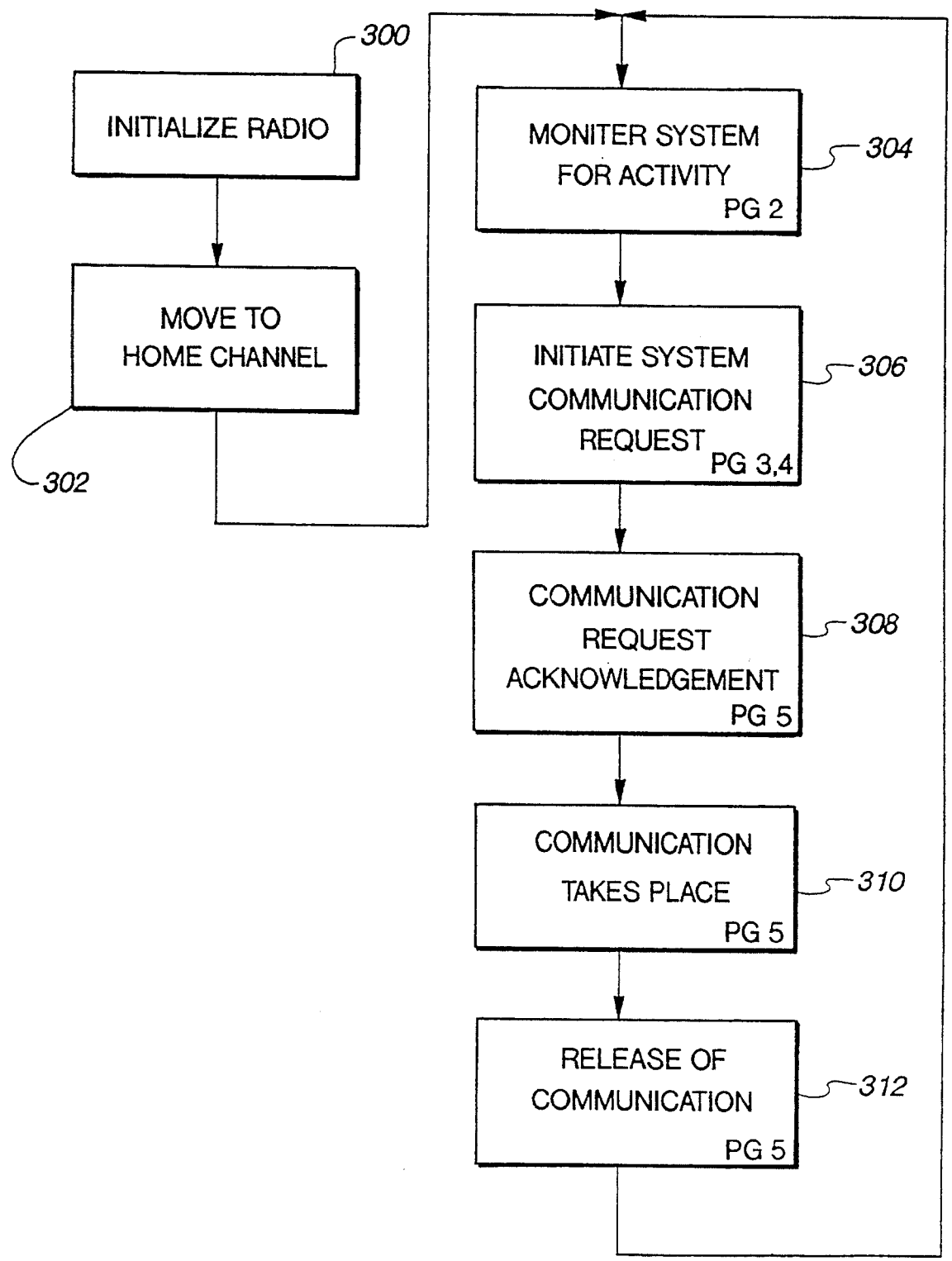
FIG. 14 is a flow diagram broadly depicting the operation of a mobile transceiver within a distributive wide area network transmission trunked communication system in accordance with the present invention.
Figure 16:
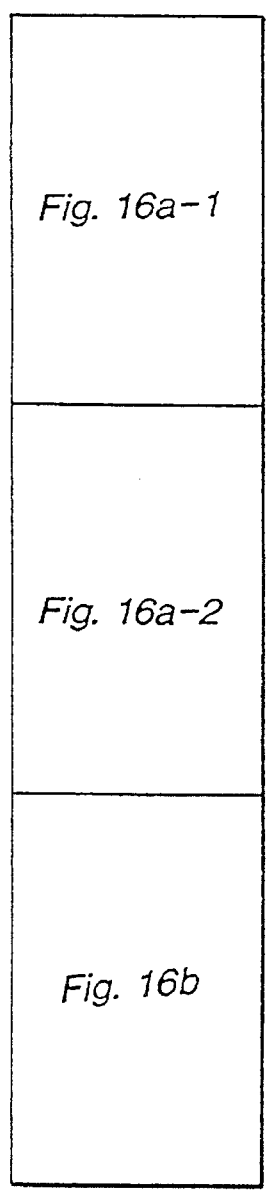
FIG. 16 shows the relationship of FIG. 16a–16b
Figure 17:
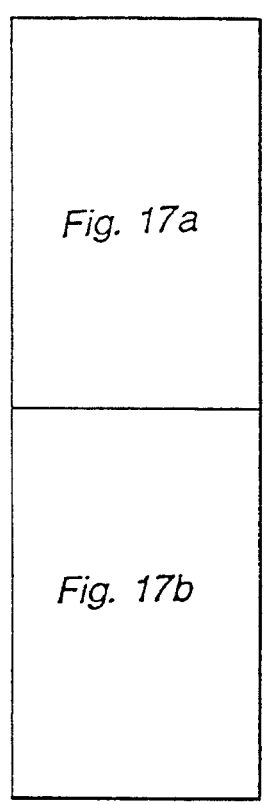
FIG. 17 shows the relationship of FIG. 17a–17b

FIG. 14, broadly depicts in flow diagram format, how a mobile transceiver 10 communicates in the communications system of the present invention. The transceiver is powered up in the initialize radio step 300. Operational flow is then immediately directed to the step 302 wherein the transceiver 10 goes to its preassigned home channel. Operational flow then proceeds to step 304, where the transceiver 10 listens for incoming signals transmitted on its home channel. As described in detail above, the transceiver will be monitoring its home channel, or other temporarily assigned channel, for signalling information relating to system priority, channel availability, etc., that is broadcast by the system.

Operational flow proceeds to step 306, to initiate a system transmission request, when the operator of the transceiver desires to transmit. The request to communicate is acknowledged in step 308 through a return control signal transmitted by the assigned repeater, and operational flow proceeds to step 310 where the transmission takes place. Once the transmission has been completed the transmitter is released in step 312, and operational flow returns to step 304 where the system continues to monitor the system for activity.

Figure 15:
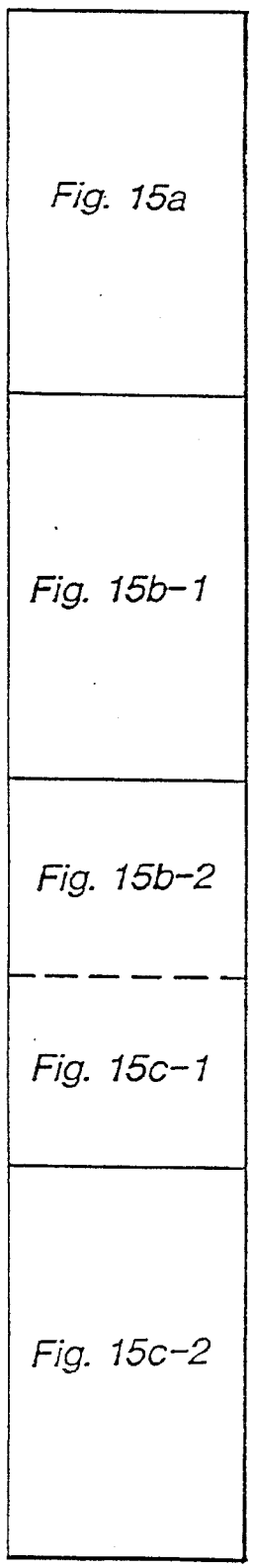
FIG. 15 shows the relationship of FIG. 15a–15c
Figure 15A:
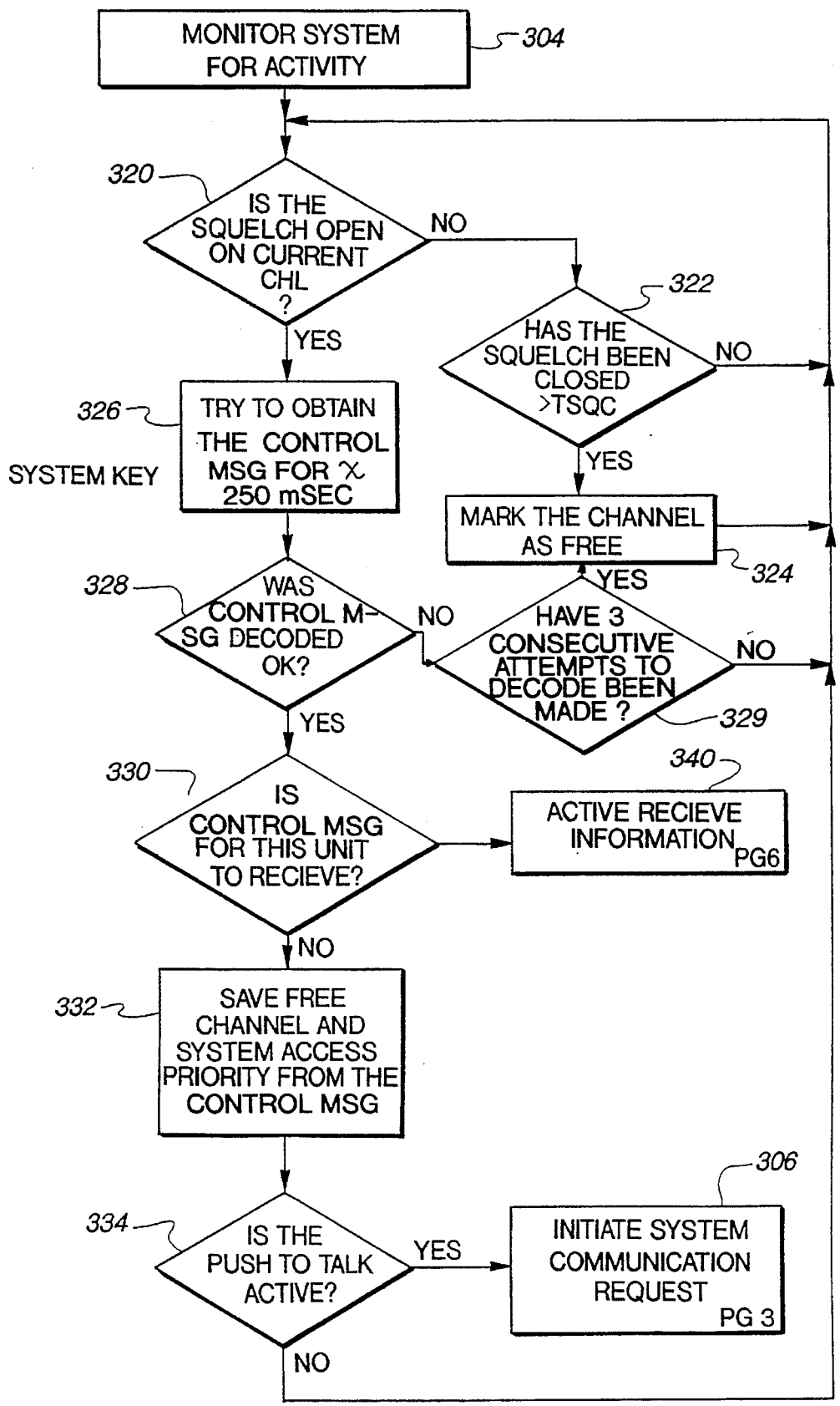
FIG. 15a–15c are flow diagrams depicting in greater detail step 309 of FIG. 14.
Figures 1, 15B:
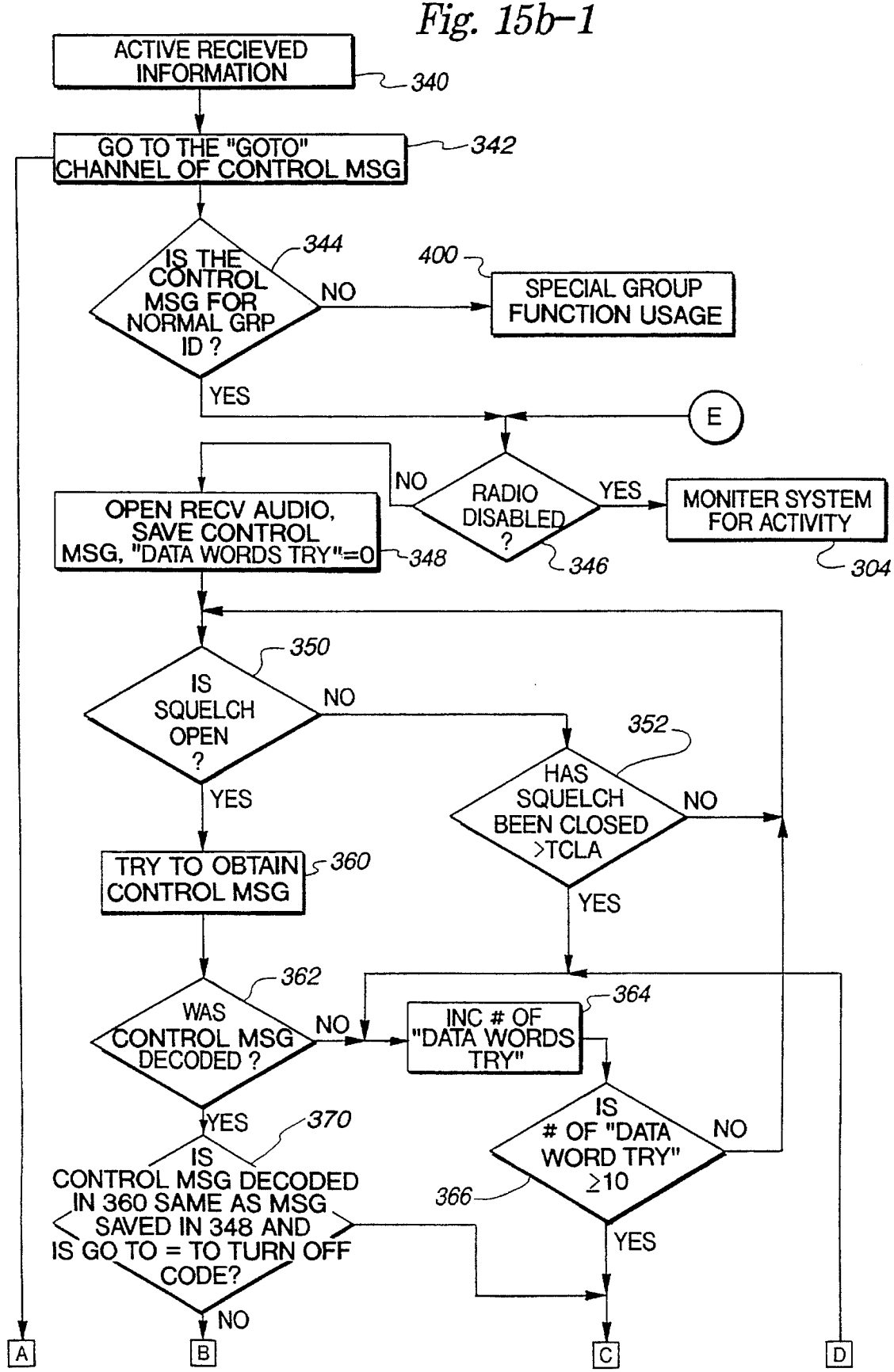
Figures 2, 15B:
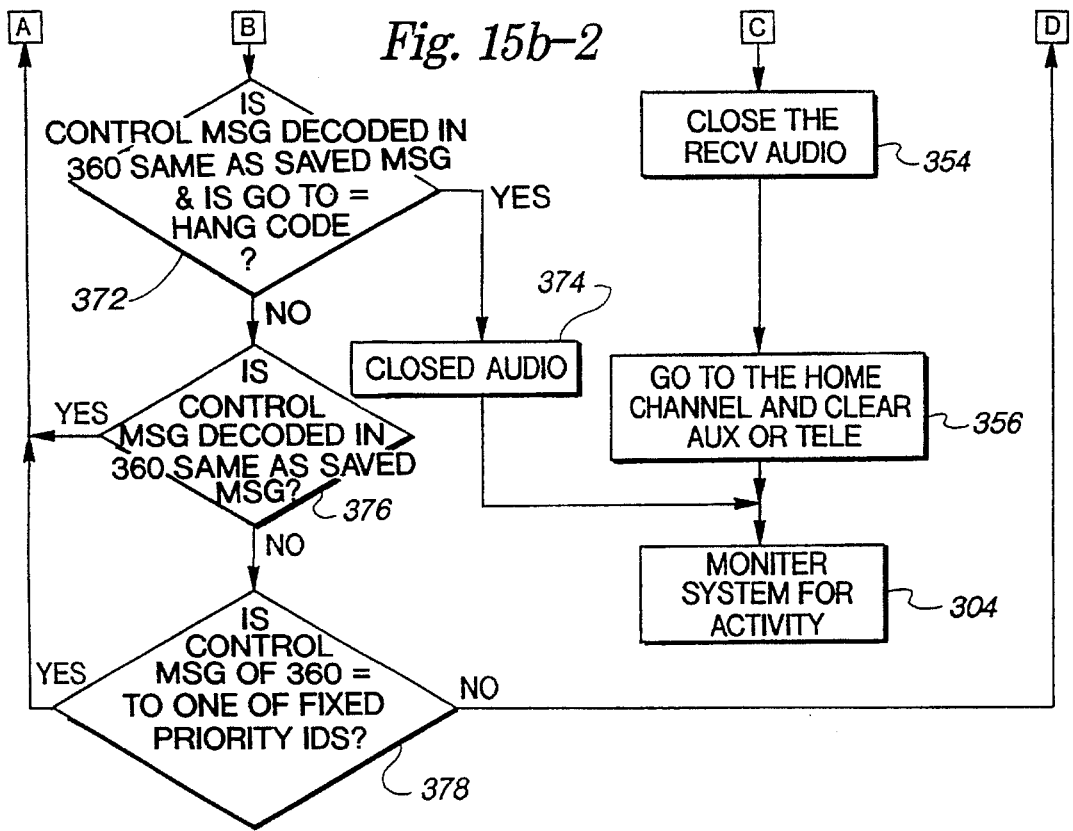
Figures 1, 15C:
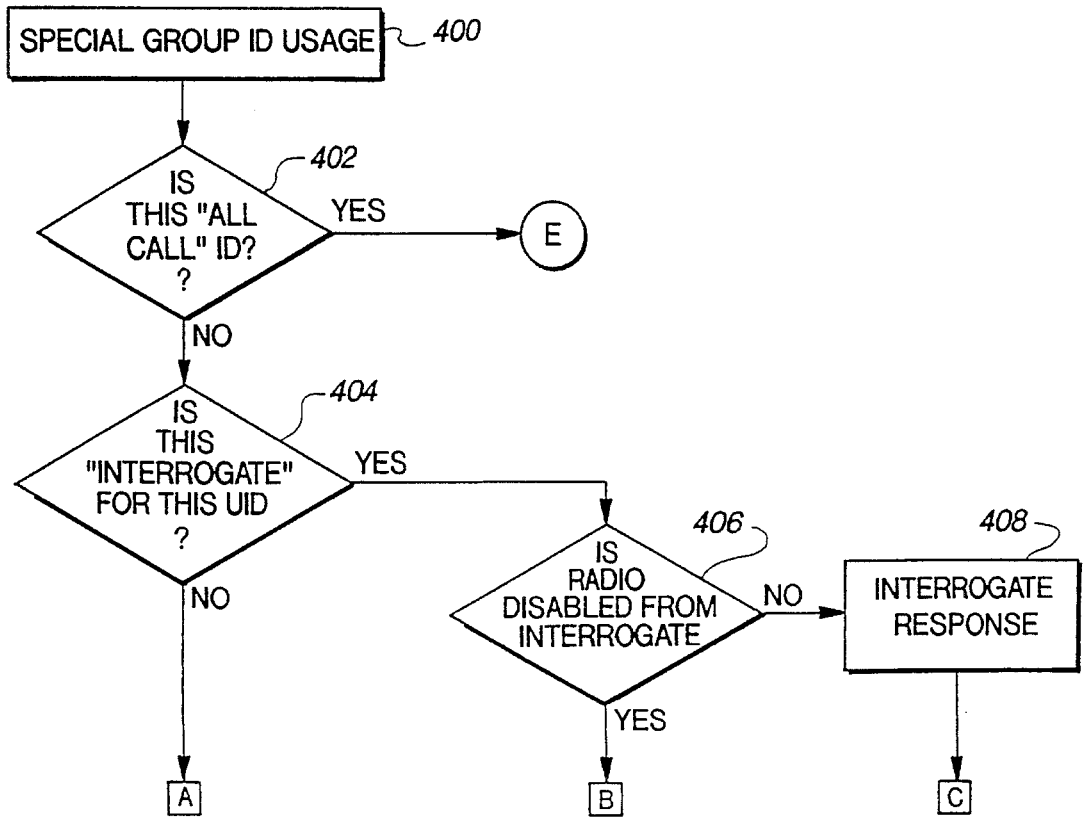

The monitor system for activity step 304 of FIG. 14 is described in greater detail in FIGS. 15a through 15c. Operational flow first proceeds to decision block 320 to determine whether the transceiver squelch has been opened for the channel currently being monitored. If the squelch is not open (i.e. the transceiver is not receiving any signals), operational flow is directed to decision block 322 to determine whether the squelch has been closed for a predetermined time frame (such as 20 milliseconds). Operational flow is directed to step 324, where the channel currently being monitored is marked as being free, if the squelch has been closed for the predetermined time period. Operational flow is then directed back to decision block 320 to again determine whether the squelch has become open. If the squelch has not been closed for the appropriate predetermined time, operational flow is directed from decision block 322 directly to block 320, without marking the channel as free. Requiring the squelch to be closed for a predetermined time before marking a channel as free prevents false indications of channel status caused by spurious noise that may be received by the transceiver.

Operational flow is directed from decision block 320 to step 326 if the squelch is determined as being open (i.e. it is determined that the transceiver is receiving signals). At step 326, the transceiver applies the system key, described herein above, and attempts to decode the control message received by the transceiver. The transceiver will attempt to decode the control message for a predetermined time of approximately 250 milliseconds. Operational flow is then directed to decision block 328 to determine whether the control message 152 was decoded. If nothing was decoded, operational flow proceeds to step 329. At step 329 the transceiver determines if three consecutive attempts to decode the control-message 152 have been attempted. If there has not been three consecurive attempts then operational flow returns to step 320 where the transceiver continues to monitor its assigned channel. If there has been three consecutive attempts then operational flow continues to step 324 and the channel is marked as free.

Operational flow is directed from decision block 328 to decision block 330, if it is determined that a proper control message has been decoded, where the transceiver will determine whether the incoming transmission is addressed to it. If the incoming transmission is addressed to the transceiver, operational flow proceeds to step 340 where the incoming signal is received and processed.

Operational flow is directed from decision block 330 to step 332, if the received transmission is not addressed to the transceiver. The free channel and system access priority information included in the received in the control message is at that point saved by the transceiver. Operational flow is then directed to decision block 334 where it is determined whether the push to talk switch of the transceiver is depressed (indicating the operator of the transceiver desires to make a transmission) or not. If the push to talk switch is depressed, operational flow is directed to step 306 where the transceiver initiates a system communication request. It will be appreciated that the free channel and system access priority data saved in step 332 will be used in the system communication request procedure.

Operational flow is returned from decision block 334 to step 320, if the push to talk switch is not depressed, where the transceiver continues to monitor for incoming transmission.

FIG. 15b depicts in detail the active receive information step 340 of FIG. 15a. At step 342, in FIG. 15b, the control message received by the transceiver is analyzed to determine which channel the transceiver needs to change frequencies to receive the transmission intended for it, and the transceiver is switched to that channel. Operational flow is next directed to decision block 344 where it is determined whether the transceiver is being addressed as part of a "normal" group of transceivers (i.e. a predetermined group of listeners such as a squad of police cars, fleet of taxi cabs, etc.), or whether the transmission being received by the transceiver is for a special group functions. If the transmission being received by the transceiver is for a special group function, operational flow proceeds to step 400 (detailed in FIG. 15c).

Operational flow is directed from decision block 344 to decision block 346 if the control message is addressed to a normal group of users. Decision block 346 determines whether the transceiver has been disabled or not. As described hereinabove, the transceiver can be remotely disabled from either receiving or transmitting. For instance, if a particular user is no longer an authorized user, the transceiver can be automatically disabled. The position of decision block 346 in relation to the determination of whether the group ID is a "normal" group is important in that a special group function as detailed In FIG. 15c, can be processed by the transceiver whether or not the transceiver has been disabled for normal voice communications or not. If the transceiver has been disabled, operational flow proceeds to step 304 for further monitoring of the system.

Operational flow proceeds from decision block 346 to step 348 if the transmission received by the transceiver is for a normal group ID and the transceiver has not been disabled. At step 348, the receive audio on the transceiver is opened, portions of the control message are saved by the transceiver for comparison in later steps, and a record entitled "data words try" (for reference later in the program at Step 364) is set to zero.

Operational flow proceeds from step 348 to decision block 350 where the transceiver determines if the squelch continues to be open. If the squelch has been closed, operational flow is directed to decision block 352 to determine whether the squelch has been closed for a predetermined time (such as 250 millliseconds). If the squelch has not been closed for the predetermined amount of time, operational flow returns from decision block 352 to decision block 350 to determine whether the squelch has been opened in the interim. The 250 millisecond delay in operational flow is used to prevent disconnection of the transceiver due to momentary fades in the incoming signal, or similar short interruptions of the signal. If the squelch has been closed for the predetermined amount of time, operational flow proceeds to step 364.

Operational flow proceeds from decision block 350 to step 360 if the transceiver squelch remains open. At step 360, the transceiver tries to again decode the control message. This is a repeat of the decode function performed at step 326. The second decode operation is required to ensure that the transceiver remains on the assigned channel through the transmission. Operational flow proceeds from step 360 to decision block 362 to determine whether successful decoding of the control message was accomplished. If there was not a successful decoding, operational flow is directed from decision block 362 to step 364 where the "data words try" record referred to in step 348 is incremented by one. Operational flow then proceeds to decision block 366 where it is determined whether there have been ten attempts to decode the control message. If there have not been ten attempts to decode the control message, operational flow is returned from decision block 366 to decision block 350 where, if the squelch still remains open, another attempt at decoding the control message is made. If ten unsuccessful tries at decoding the control message are made, operational flow is directed from decision block 366 to steps 354 and 356 where the receive audio is closed, the transceiver is directed back to its home channel, and operational flow again returns to the monitor system activity step 304.

Once the control message has been successfully decoded, operational flow proceeds from decision block 362 to decision block 370, where the control message decoded in step 360 is compared to the control message saved in step 344. The comparison is required because control messages are continuously transmitted by the system, and it is possible that the repeater could interleave different control signals on the same channel during the time the transceiver is receiving a transmission. Comparing the control signals received during a transmission to the control signal that initiated reception of the transmission is required so that the transceiver will not shift to receive a second transmission having a different control signal. If the control message is the same as the saved control message, and if the "go to" field of the control message is the turn off code (indicating the end of the received transmission), operational flow is directed to steps 354 and 356 where the receive audio is closed, the transceiver is set to the home channel, and is cleared of any auxiliary and telephone settings. Operational flow then proceeds to step 304 for continued monitoring of system activity.

Operation flow is directed to decision block 372 if the tests of block 370 are not both met. Operational flow is directed from decision block 372 to step 374 if the control message decoded at step 360 is the same as the control message saved in step 348, and the "go to" field is a hang code. The receive audito is closed in step 374 and operational flow is returned to step 304 for continued monitoring of system activity. It will be noted that the operation flow does not reset the transceiver to the home channel when the long code is detected. The option to "hang" the transceiver on a channel, while closing the receive audio, can be used to hold the channel to maintain the priority of an individual call.

Operational flow is directed to decision block 376 if the tests of block 372 are not met. If the control message decoded in step 360 is the same as the message saved in step 348, operational flow is redirected to step 342. It will be appreciated that operational flow will stay in a loop to step 392 throughout a received transmission as long as the received control message remains unchanged.

Operational flow is directed to decision block 378 if the test of block 376 is not met. The transceiver can be preprogrammed with two separate group IDs. If the group ID of the control message decoded in step 360 is one of the two preprogrammed group IDs, operational flow is directed from block 378 to step 342. If the test of block 378 is not met, operational flow is directed to step 364.

The processing of special group IDs, step 400, is depicted in detail in FIG. 15c. Operational flow is first directed to decision block 402 where it is determined whether the special group ID is an "all call" ID (i.e., all transceivers are to receive the communication). If the special group ID is an "all call" ID, operational flow is directed back to decision block 346 of figure 15b. If the transceiver has not been disabled (decision block 346), the incoming transmission is processed for reception by the transceiver as described above.

Operational flow is directed from decision block 402 to decision block 404 if a special group ID is not an "all call" ID. Block 404 determines whether or not there is an "interrogate" special group ID presented by the control message. The interrogate function instructs the transceiver to immediately respond to the transmitting repeater with the present status of the transceiver. In particular, the operator of the transceiver can selectively input a message to be automatically transmitted to the repeater as to what the operator is presently doing (for example, the operator is not in the vehicle, the operator has completed an assigned job, or the operator is waiting for a new assignment). Operational flow is directed to the decision block 406 if the test of block 404 is met. At block 406, it is determined whether the transceiver has been disabled from the interrogate function. For instance, if the transceiver had been stolen, and the system no longer wishes to track the location of the mobile, the interrogate function of the transceiver could be disabled. If the transceiver has not been disabled from the interrogate function, operation flow proceeds from decision block 406 to step 408 where the preprogrammed response to the interrogate special group ID is transmitted.

Operational flow is directed from decision block 404 to decision block 412 if the group ID is not an "interrogate" signal for the transceiver. Operational flow is then directed from decision block 412 to step 410 if the transceiver has been disabled. The transceiver is set to its "home" channel at step 410 and is directed back to step 304 for continued monitoring of system activity.

Operational flow is directed from decision block 412 to decision block 414, where it is determined whether the special group ID is an auxiliary call for the transceiver, if the transceiver has not been disabled. If the incoming transmission is an auxiliary call, (i.e., an individual as opposed to a fleet call to a particular transceiver), operational flow is directed from decision block 414 to step 416 where the incoming call is marked for full duplex communications to handle the auxilliary call. Operational flow is then directed from step 416 to decision block 346 of FIG. 15b.

Operational flow is directed from decision block 414 to decision block 418 if it is determined that the incoming transmission is not an auxiliary call for the transceiver. At decision block 418 it is determined whether the incoming transmission is a telephone call for the transceiver. If the incoming transmission is a telephone call for the transceiver, operational flow is directed from decision block 418 to step 420 where the incoming transmission is marked for full duplex communications to handle the telphone call. Operational flow is then directed from step 420 to decision block 346 of FIG. 15b.

Operational flow is directed to decision block 422 if the test of block 418 is not met. At block 422 it is determined whether the incoming transmission is a dynamic reassignment for the transceiver. If the incoming transmission is a dynamic reassignment for the transceiver, operational flow is directed to step 424 where the dynamic reassignment occurs, as described hereinabove. Operational flow is then directed from step 424 to step 410 and is then returned to step 304 for continued monitoring of the system activity.

Operational flow is directed from decision block 422 to decision block 426 if the incoming transmission is not a dynamic reassignment for the transceiver. At decision block 426, it is determined whether the incoming transmission is a disablement command for the transceiver. If the incoming transmission is a disablement command, operational flow is directed to step 428 where the transceiver is disabled. Operational flow then proceeds to step 410 for reassignment of the transceiver to its home channel, and then to step 304 for continued monitoring of the system.

Figures 1, 16A:
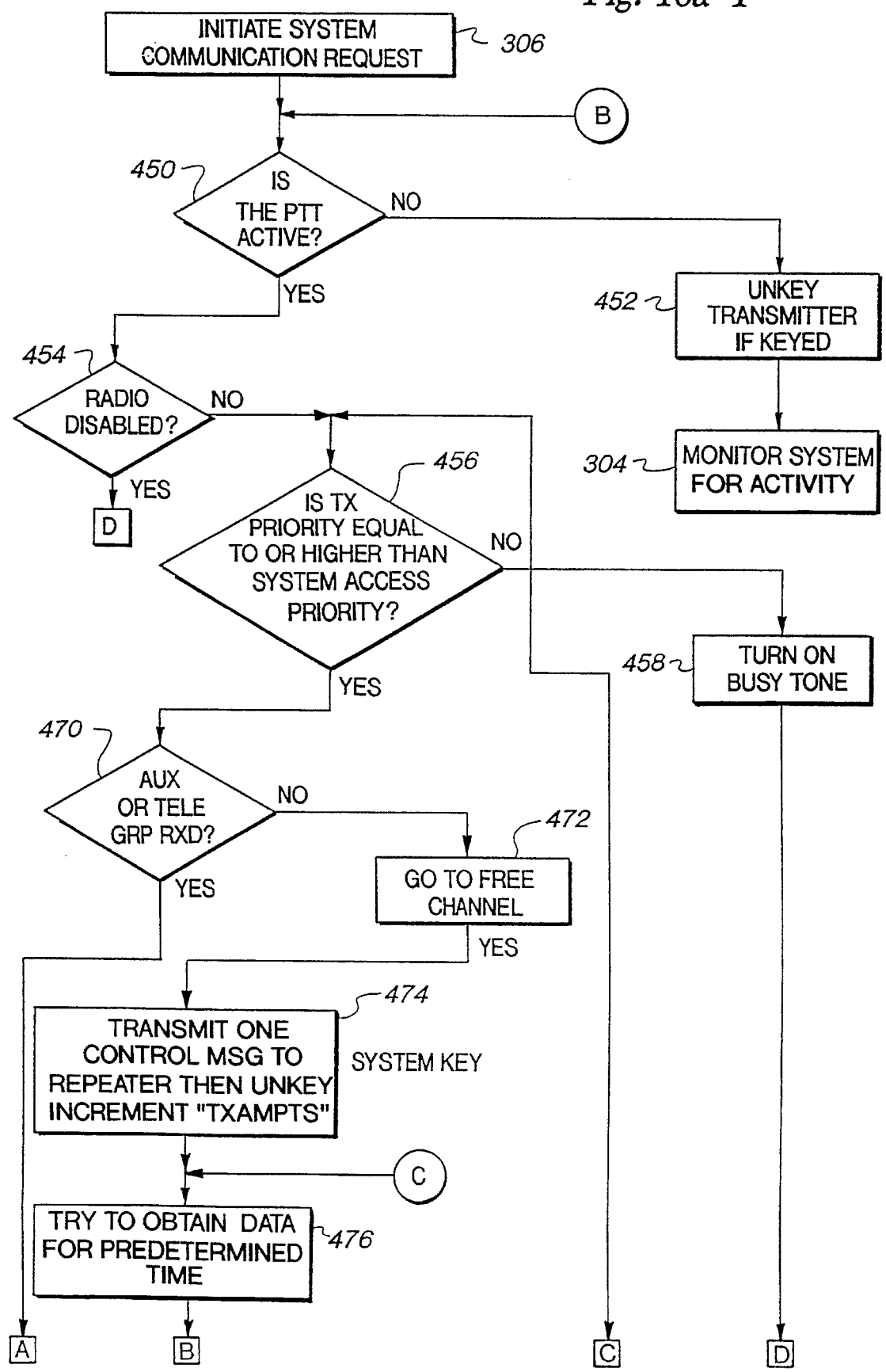
FIG. 16a–16b are flow diagrams depicting in greater detail step 306 of FIG. 14.
Figures 2, 16A:
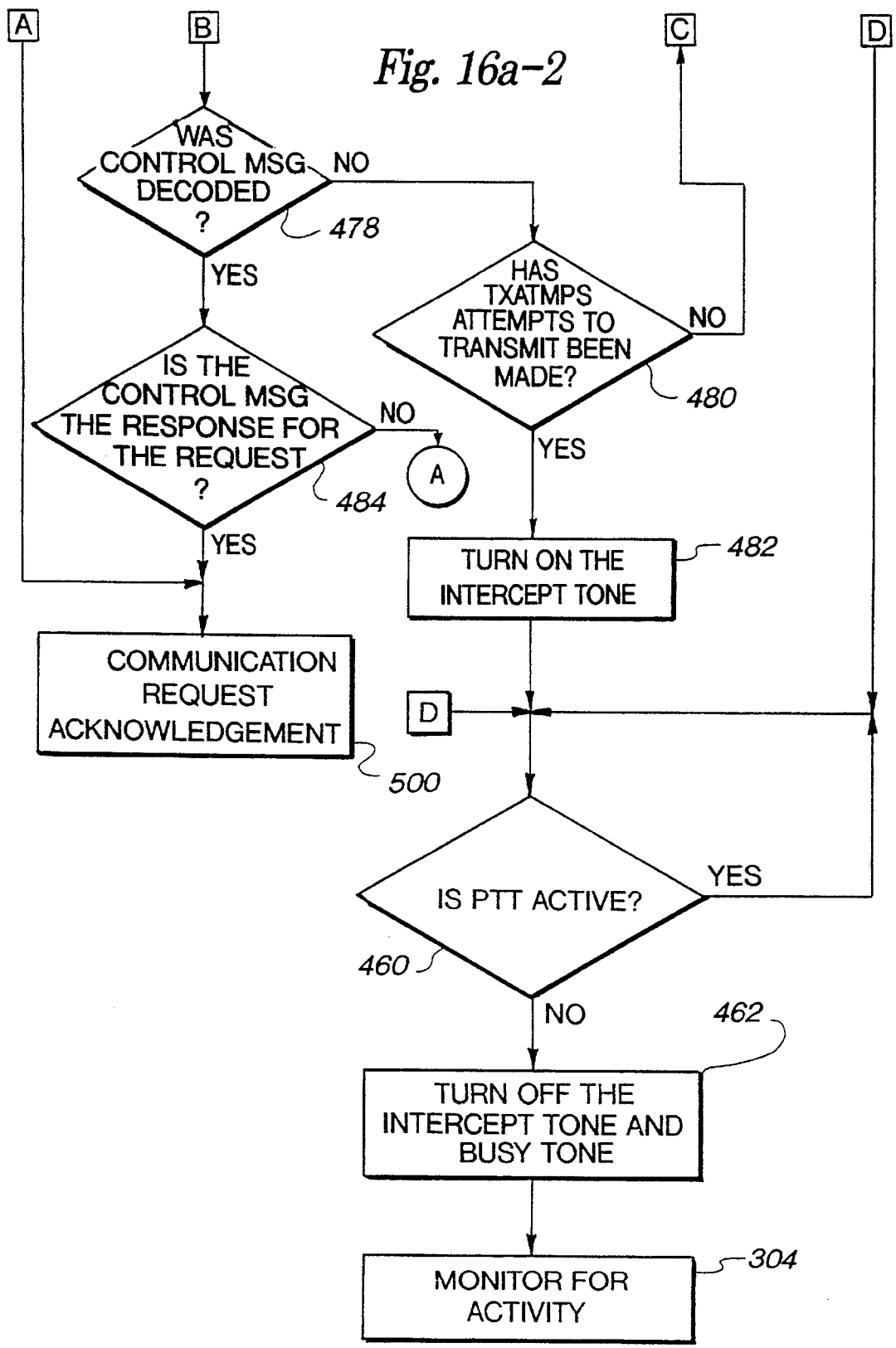
Figure 16B:
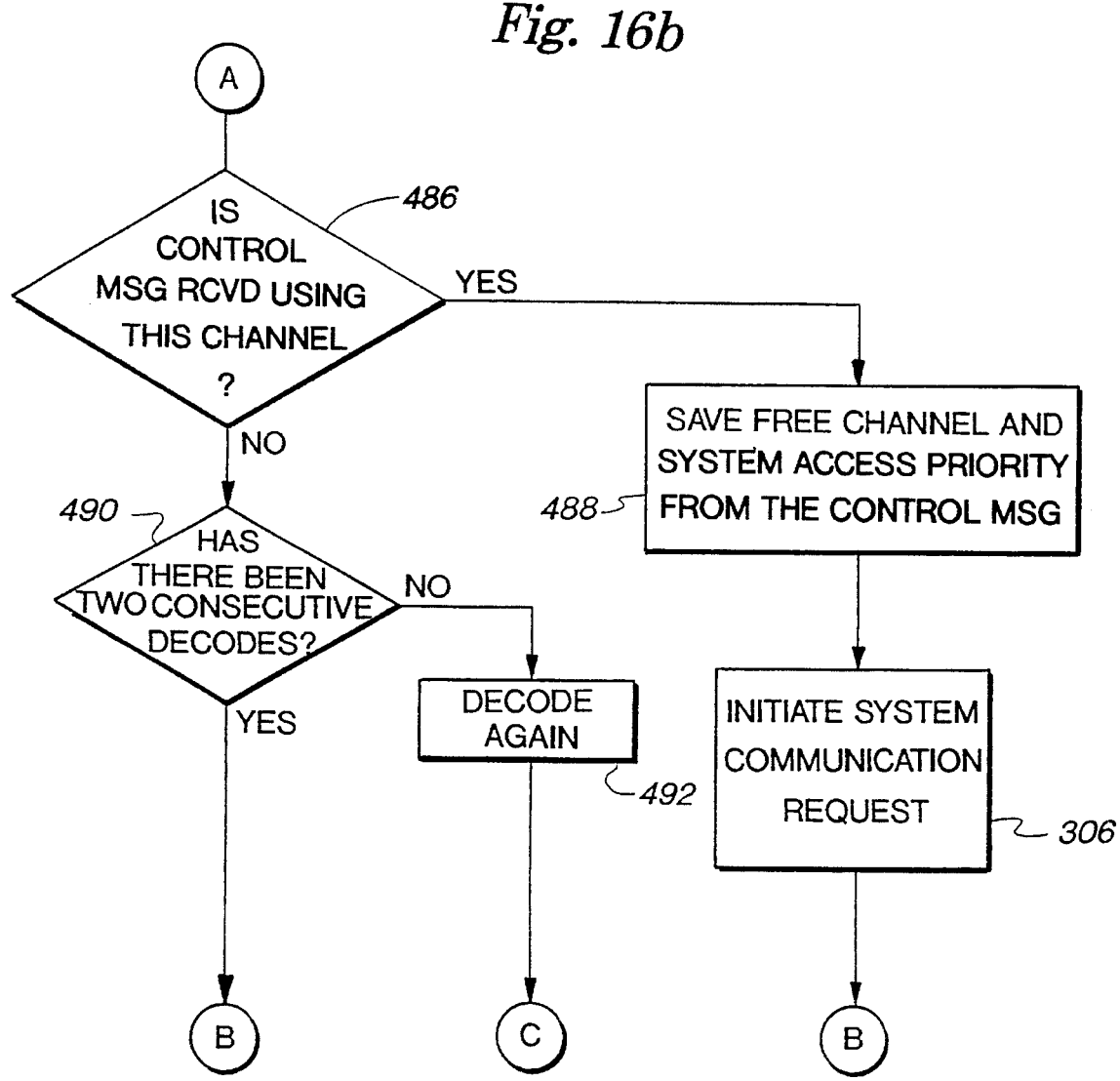
Figure 17A:
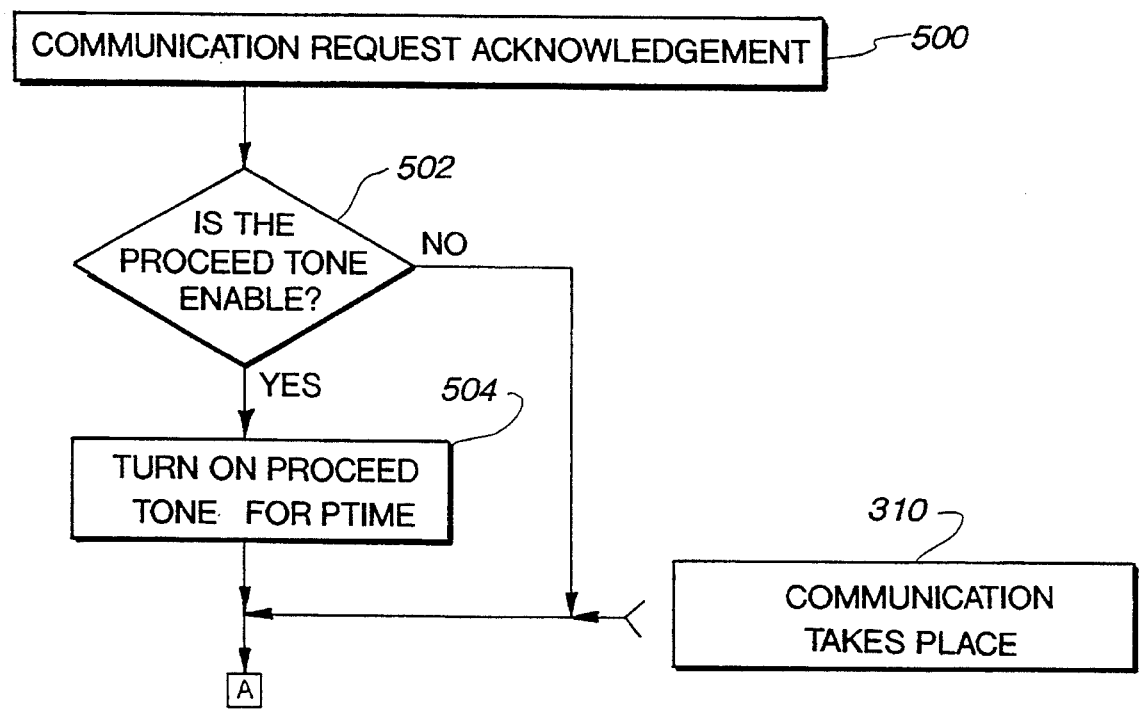
FIG. 17a–17b is a flow diagram depicting in greater detail steps 308312 of FIG. 14.
Figure 17B:
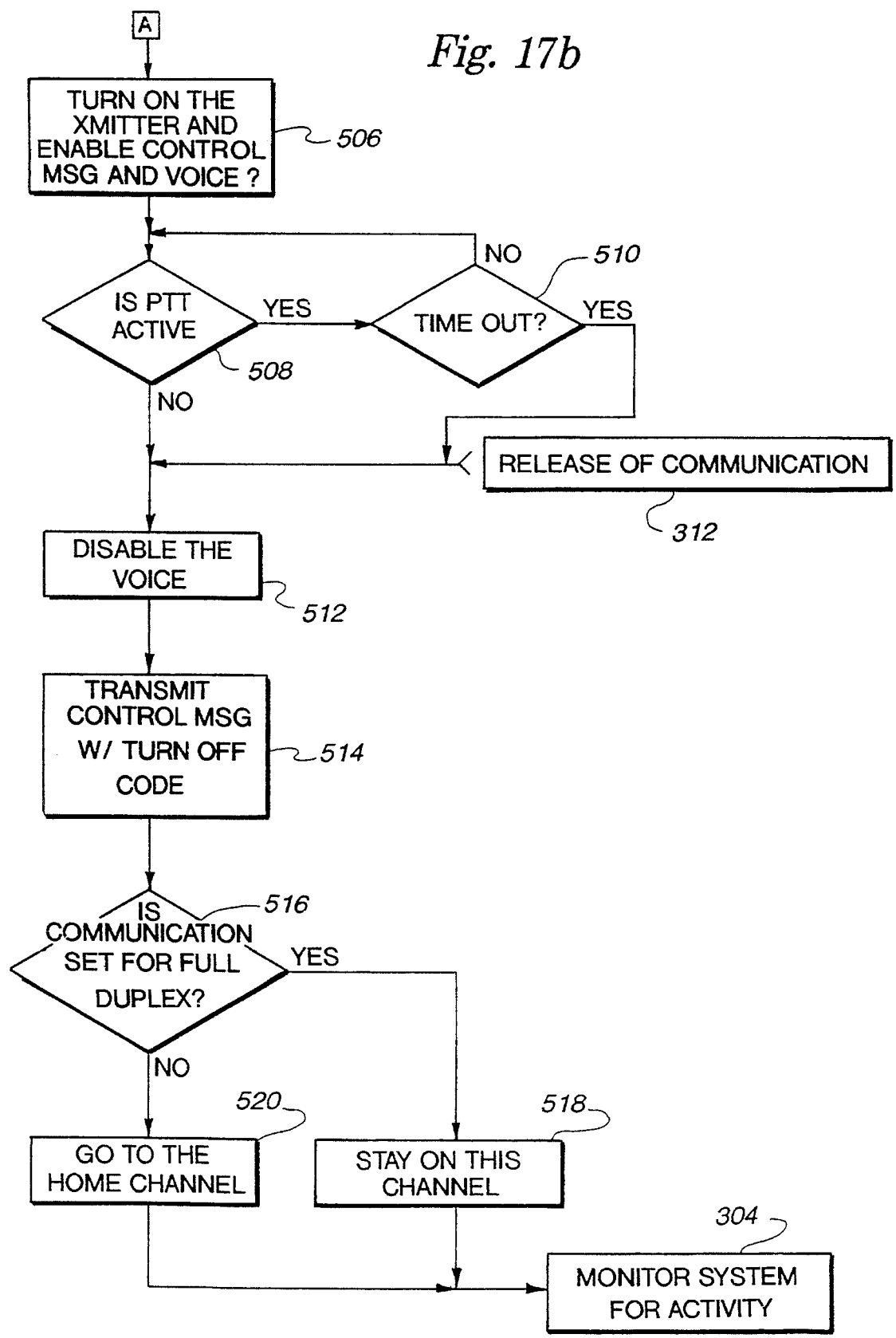

The initiate system communication request step 306 is depicted in detail in FIGS. 16a and 16b. Operational flow is first directed to decision block 450 where it is determined whether the push to talk switch has been depressed by the operator of the transceiver. If the push to talk switch has not been depressed, operational flow is directed to step 452 where the transmitter is unkeyed, and operational flow is returned to step 304 for continued monitoring of the system activity. Operational flow is directed from decision block 450 to decision block 454 if the push to talk switch of the transceiver is depressed by the operator. At decision block 454, it is determined whether the radio has been disabled. If the radio has been disabled, operational flow proceeds from decision block 454 to decision block 460 where it is determined whether the push to talk is still depressed. If the push to talk switch is still depressed, and the radio has been disabled, operation flow remains at block 460. Once the operator releases the push to talk switch operational flow is directed to step 462 where the busy tone and intercept tone is released and the operational flow is directed to step 304 for continued monitoring of the system activity.

Operational flow is directed from decision block 454 to decision block 456 if the push to talk switch is depressed and the transceiver has not been disabled. The priority of the desired outgoing transmission is compared to the current system access priority. It will be appreciated that the determination of access priority is being made at the transceiver, prior to any outgoing transmission being made by the transceiver. If the transmission priority in the transceiver is not equal to or higher than the current system access priority, operational flow is directed to step 458 where the busy tone is initiated.

Operational flow is directed from decision block 456 to decision block 470 if the priority of the desired outgoing transmission is equal to or higher than the current system access priority. At decision block 470, it is determined whether an auxiliary or telephone group has been received. If the auxiliary or telephone group has been received, operational flow is directed from decision block 470 to step 500 for communication request acknowledgement, since the handshaking requirements of steps 472–492, and 460, 462 are not required in full duplex operation of the transceiver.

It will be appreciated by those skilled in the art, that if full duplex operation is not provided for, a handshaking procedure must be followed to initiate communications. The handshaking procedure is initiated by directing operational flow from decision block 470 to step 472 where the transceiver is directed to a free channel. Operational flow next proceeds to step 474 where one control message is transmitted from the transceiver to the repeater initiating the call. Also in step 474, the record of the number of attempts made by the transceiver to transmit a control message to a repeater is incremented by one. It will be appreciated that the record of transmitting attempts ("TXAMPTS") is zeroed out at step 306 where the system communication request is initiated.

Operational flow is next directed to step 476 where the transceiver attempts to obtain a control message back from the repeater in response to the transmission at step 474. The attempt at step 476 continues for approximately 250 milliseconds. Operational flow is next directed to decision block 478 where it is determined whether or not a control message was received and decoded by the transceiver. If a control message was decoded, operational flow proceeds to decision block 484 where it is determined whether or not the received control message was in fact a response to the request initiated at step 474. Assuming the reponse was valid, operational flow is directed from block 484 to step 500 where the communication request is acknowledged and full communication is allowed.

If no control message is decoded at decision block 478, operational flow is directed to block 480 where it is determined how many attempts at transmitting a control message from the transceiver (step 474) have been made. If a predetermined number of attempts (for instance 10) have not been made, operational flow is redirected to decision block 456 to set up another attempt at establishing a handshake between the transceiver and the repeater. If more than 10 attempts have been made, operational flow is directed to step 482 where an intercept tone is presented by the transceiver to the operator, indicating that the handshake was not accomplished, and communications have not been established. Operational flow then proceeds from step 482 to decision block 460 where it is determined whether the push to talk switch has been depressed. If the push to talk switch is depressed operational flow is hung at decision block 460 until the push to talk swtich is released. Once the push to talk switch is released, operational flow proceeds from decision block 460 to step 462 where the intercept tone and the busy tone are turned off. Operational flow then returns to step 304 for continued monitoring of system activity.

Returning to decision block 484, if a control message is received by the transceiver, but the control message received is not a proper response to the handshake, operational flow is directed to decision block 486. It will be appreciated that receiving any response to the handshake, even if not a proper response, is preferable to receiving no response, because it indicates to the transceiver that it is in communications range. At decision block 486, the transceiver determines whether the control message received indicates that the same channel is already occupied. Operational flow is directed to step 488, if the channel is so occupied, where the free channel information and system access priority information is saved from the received control message. Operational flow is then redirected to step 450 where the handshaking procedure will again be initiated.

Operational flow is directed to decision block 490 if the test of block 486 is not met. Operational flow will be directed from block 490 to step 492 and then back to step 476 if there have been less than two consecutive trys to decode a control message received in response to the control message transmitted at step 74 by a transceiver. If there have been two consecutive attempts at decoding, operational flow is returned to block 450 where another attempt at handshaking will be made.

The communication request is acknowledged at step 500, when a successful handshake is made. Operational flow is then directed to block 502. Decision block 502 is a user selectable feature. A proceed tone can be enabled if the user of a transceiver wants to hear an audible signal when a communication request has been acknowledged. If the proceed tone feature is enabled, operational How proceeds from its decision block 502 to step 504 where the audible tone is initiated, and is then directed to step 506. If the proceed tone feature is not enabled, operational flow proceeds directly from decision block 502 to step 506 and the transceiver control message and voice circuits are enabled.

Operational flow proceeds from step 506 to decision block 508 where it is determined whether the push to talk switch is active. The operational flow will stay at step 508 as long as the push to talk switch is depressed, or until a predetermined time out period expires. Once the push to talk switch is released, operational flow proceeds to step 512 where the voice circuit is disabled, and then to step 514 where one control message with a turnoff code is transmitted. Operational flow then proceeds to decision block 516 to determine whether the transceiver has been set for full duplex opertion. The transceiver is maintained at the channel it is currently on (step 518) if communications are full duplex. The transceiver is reset to its home channel (step 520), if full duplex operations are not required.

We claim:

1. A remote network switch for a land mobile transmission trunked communication system, the land mobile transmission trunked communication system having a plurality of transceiver means for transmitting and receiving radio communications over one or more radio channels, the remote network switch comprising:

a plurality of repeater sites, each repeater site comprising a plurality of repeater means, each repeater means for establishing transmission trunked radio communications on a preassigned one of the radio channels between the repeater means and one or more transceiver means, the transmission trunked communications having either voice information, data information, or both, and a control signal, and the plurality of repeater means at a repeater site operably connected together by a high speed bus means for synchronously communicating control signals among the plurality of repeater means using a variable time multiplex system having a frame time period which is based on a number of repeater means at the repeater site; and switch means for selectively interconnecting two or more repeater means at two or more repeater sites in response to a control signal from a transceiver means, the switch means operably connected to each of the repeater means by a network bus means separate from the high speed bus means, for synchronously communicating control and information signals between the repeater means and the switch means.

2. The remote network switch of claim 1 wherein each of the transceiver means is assigned a unique identification number that is communicated as part of the control signals.

3. The remote network switch of claim 1 wherein the information signals for the transmission trunked radio communication are transmitted on a distributively selected one of the preassigned radio channels for the repeater means and the control signals for the transmission trunked radio communications are transmitted simultaneously in the subaudio range of the same channel over which the information signals are transmitted according to a predetermined control signal format.

4. The remote network switch of claim 1 wherein the predetermined control signal format comprises:

a first predetermined control signal format when the control signals are transmitted from the transceiver means to the repeater means having:

a nine bit Sync field that initializes and synchronizes the repeater means;

a one bit Reserved field that indicates a transceiver means control message;

a ten bit GoTo field that contains a directly decodable predetermined radio channel number of one of the repeater mans to which the control signals are being transmitted;

a five bit Home field that contains a predetermined home number of the transceiver means sending the control signal;

an eight bit Group field that contains a Group ID code of a fleet or subfleet of transceiver means which are being called;

a three bit Status field that defines the status of the transceiver means;

a thirteen bit Unique ID field that contains the unique identification number for the transceiver means;

a three bit Priority field that indicates a predetermined priority level assigned to the transceiver means; and an eight bit Checksum filed that includes a seven bit truncated BCH encoding scheme checksum and a single bit parity; and a second predetermined control signal format when the control signals are transmitted from the repeater means to the transceiver means having:

a nine bit Sync field that initializes and synchronizes the transceiver means;

a one bit Reserved field that indicates a repeater means control message;

a ten bit GoTo field that contains a directly decodable predetermined radio channel number of one of the repeater means that the transceiver means should tune to in order to receive the control signals that are being transmitted by that repeater means;

a five bit Home field that contains a predetermined home number of one of the repeater means;

an eight bit Group field that contains a Group ID code of a fleet or subfleet of transceiver means which are being called;

a ten bit Free field that contains a directly decodable predetermined radio channel number of one of the repeater means that is not busy and is available for service;

a thirteen bit Unique ID field that contains the unique identification number for the transceiver means;

a three bit Priority field that indicates a current operating priority level for all of the repeater means; and an eight bit Checksum field that includes a seven bit truncated BCH encoding scheme checksum and a single bit parity.

5. The remote network switch of claim 4 wherein the first and second predetermined control signal formats are further encrypted using a two word encoding key to encode and decode each control signal transmission whereby a first word encoding key is used to encrypt the entire first or second predetermined control signal except the Sync field and a second word encoding key is used to encrypt the Checksum field.

6. The remote network switch of claim 1 wherein the control signals are communicated among the repeater means by the high speed bus means according to a first bus protocol and wherein the control signals and the information signals are communicated between the repeater means and the switch means by the network bus means according to a second bus protocol.

7. The remote network switch of claim 1 wherein the first bus protocol is arranged into a plurality of messages, one message for each of the repeater means, each message having a predetermined number of words that are made up of a predetermined number of bits, and wherein the first bit of each word is a sync bit and only the first bit of the first word of a message is set to one to indicate the start of a new message and the first bit of all other words of the message are set to zero.

8. The remote network switch of claim 7 wherein each of the repeater means detects the sync bit for each message and if the sync bit is not present, updates a count of a number for the repeater means and checks for the sync bit of the next message from the next repeater means whereby the total time to transmit the messages according to the first bus protocol can be less than the total number of messages if one or more repeater means does not transmit a corresponding message.

9. The remote network switch of claim 1 wherein any of repeater means may be added to or removed from the high speed bus means without affecting the operation of the remote network switch and wherein no one of the repeater means is responsible for synchronization of the high speed bus means.

* * * * *